(12) United States Patent
Lee et al.

(10) Patent No.: US 11,678,345 B2
(45) Date of Patent: Jun. 13, 2023

(54) METHOD AND APPARATUS FOR OPERATING RESOURCE SELECTION AND HARQ OPERATION IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/706,266

(22) Filed: Mar. 28, 2022

(65) Prior Publication Data

US 2022/0217767 A1 Jul. 7, 2022

Related U.S. Application Data

(63) Continuation of application No. PCT/KR2021/001883, filed on Feb. 15, 2021.

(Continued)

(51) Int. Cl.
*H04L 1/1812* (2023.01)
*H04W 72/23* (2023.01)
(Continued)

(52) U.S. Cl.
CPC ........... *H04W 72/23* (2023.01); *H04L 1/1812* (2013.01); *H04L 5/0053* (2013.01); *H04W 72/02* (2013.01);
(Continued)

(58) Field of Classification Search
CPC . H04W 72/14; H04W 72/02; H04W 72/1263; H04W 72/1278; H04W 72/0413;
(Continued)

(56) References Cited

U.S. PATENT DOCUMENTS 9,797,976 B2 * 10/2017 Wen .................. G01N 27/4145
11,464,002 B2 * 10/2022 He ........................ H04L 1/1812
(Continued)

FOREIGN PATENT DOCUMENTS

WO 2018-004322 1/2018

OTHER PUBLICATIONS

PCT International Application No. PCT/KR2021/001883, International Search Report dated Jul. 27, 2021, 6 pages.
(Continued)

*Primary Examiner* — Hanh N Nguyen
(74) *Attorney, Agent, or Firm* — Lee Hong Degerman Kang Waimey

(57) ABSTRACT

A method for performing wireless communication by a first apparatus is proposed. The method may comprise the steps of: receiving a configured grant (CG) from a base station, wherein the CG includes information about a physical uplink control channel (PUCCH) resource associated with a sidelink; on the basis of the CG, transmitting a physical sidelink control channel (PSCCH) to a second apparatus; on the basis of the CG, transmitting, to the second apparatus, a physical sidelink shared channel (PSSCH) associated with the PSCCH, wherein SL hybrid automatic repeat request (HARQ) feedback is disabled; and on the basis of a retransmission associated with the PSSCH, having not been requested, transmitting an acknowledgement (ACK) to the base station via the PUCCH resource.

8 Claims, 26 Drawing Sheets

Related U.S. Application Data

(60) Provisional application No. 62/983,437, filed on Feb. 28, 2020, provisional application No. 62/982,748, filed on Feb. 27, 2020, provisional application No. 62/982,056, filed on Feb. 26, 2020, provisional application No. 62/981,016, filed on Feb. 24, 2020, provisional application No. 62/977,134, filed on Feb. 14, 2020.

(51) Int. Cl.
   *H04L 5/00* (2006.01)
   *H04W 72/02* (2009.01)
   *H04W 72/1263* (2023.01)
   *H04W 72/20* (2023.01)

(52) U.S. Cl.
   CPC ....... *H04W 72/1263* (2013.01); *H04W 72/20* (2023.01)

(58) Field of Classification Search
   CPC ... H04W 72/0406; H04W 4/40; H04W 92/18; H04L 1/1812; H04L 5/0053; H04L 1/18
   See application file for complete search history.

(56) References Cited

U.S. PATENT DOCUMENTS

| | | | |
|---|---|---|---|
| 2021/0136742 A1* | 5/2021 | Huang | H04W 72/0406 |
| 2021/0168790 A1* | 6/2021 | Li | H04W 72/1278 |
| 2021/0377912 A1* | 12/2021 | El Hamss | H04L 1/1819 |
| 2022/0045800 A1* | 2/2022 | Chen | H04L 1/1812 |

OTHER PUBLICATIONS

Samsung, "On Resource Allocation for NR V2X Mode 1," R1-1912459, 3GPP TSG RAN WG1 #99, Nov. 2019, 12 pages.

Huawei et al., "Sidelink resource allocation mode 1," R1-1911883, 3GPP TSG RAN WG1 Meeting #99, Nov. 2019, 26 pages.

Sequans Communications, "On HARQ procedure for NR sidelink," R1-1913012, 3GPP TSG RAN WG1 Meeting #99, Nov. 2019, 8 pages.

NEC, "Mode 1 resource allocation mechanism for NR sidelink," R1-1912616, 3GPP TSG RAN WG1 #99, Nov. 2019, 9 pages.

\* cited by examiner

FIG. 4
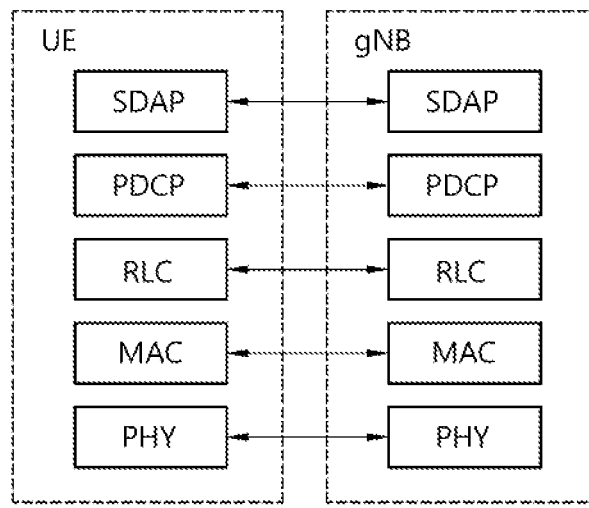
(a)
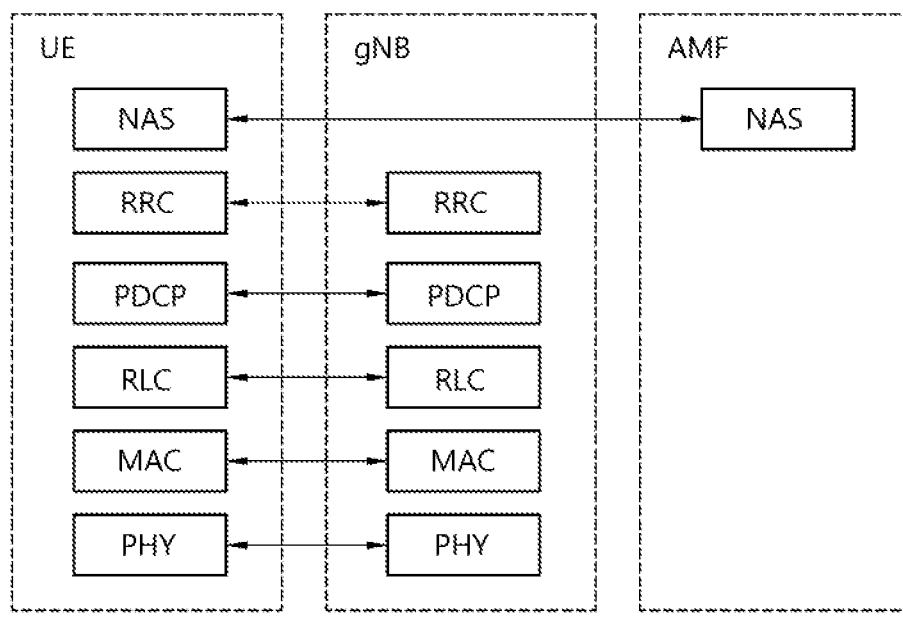
(b)

FIG. 8
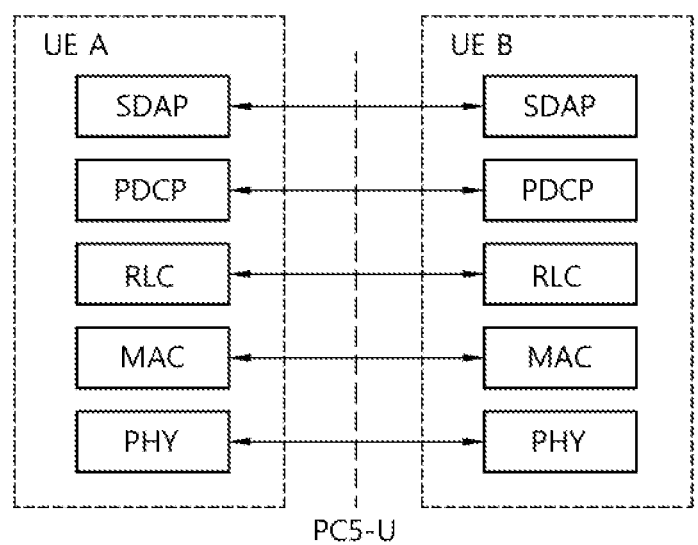
(a)
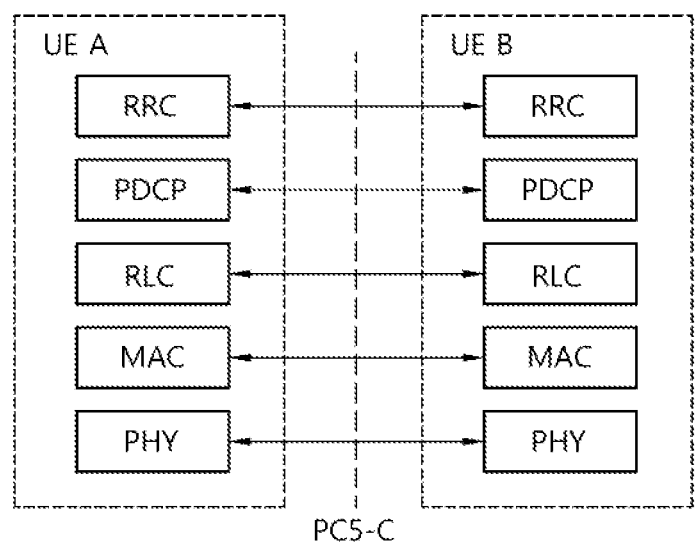
(b)

METHOD AND APPARATUS FOR OPERATING RESOURCE SELECTION AND HARQ OPERATION IN NR V2X

CROSS-REFERENCE TO RELATED APPLICATIONS

This application is a continuation of International Application No. PCT/KR2021/001883, filed on Feb. 15, 2021, which claims the benefit of U.S. Provisional Patent Application Nos. 62/977,134 filed on Feb. 14, 2020, 62/981,016 filed on Feb. 24, 2020, 62/982,056 filed on Feb. 26, 2020, 62/982,748 filed on Feb. 27, 2020, and 62/983,437 filed on Feb. 28, 2020, the contents of all of which are hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X communication or NR sidelink communication, when a base station signals a mode 1 grant to a transmitting UE, an associated PUCCH resource may be allocated or scheduled for the transmitting UE. Then, for example, if the transmitting UE performs transmission without requesting or receiving sidelink HARQ feedback from a receiving UE through the mode 1 transmission resource, and if the transmitting UE needs additional retransmission resource(s), a method for requesting resource(s) from the base station may be required. Also, for example, if the transmitting UE performs transmission without requesting or receiving sidelink HARQ feedback from the receiving UE through the mode 1 transmission resource, and if additional retransmission resource(s) is not required, it may be necessary for the transmitting UE to inform the base station that additional retransmission resource(s) is not required.

Technical Solutions

In one embodiment, a method for performing, by a first device, wireless communication is provided. The method may comprise: receiving, from a base station, a configured grant (CG) including information on a physical uplink control channel (PUCCH) resource related to sidelink (SL); transmitting, to a second device, a physical sidelink control channel (PSCCH) based on the CG; transmitting, to the second device, a physical sidelink shared channel (PSSCH) related to the PSCCH based on the CG; and transmitting, to the base station through the PUCCH resource, acknowledgment (ACK), based on SL hybrid automatic repeat request (HARQ) feedback being disabled and retransmission related to the PSSCH not being required.

EFFECTS OF THE DISCLOSURE

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
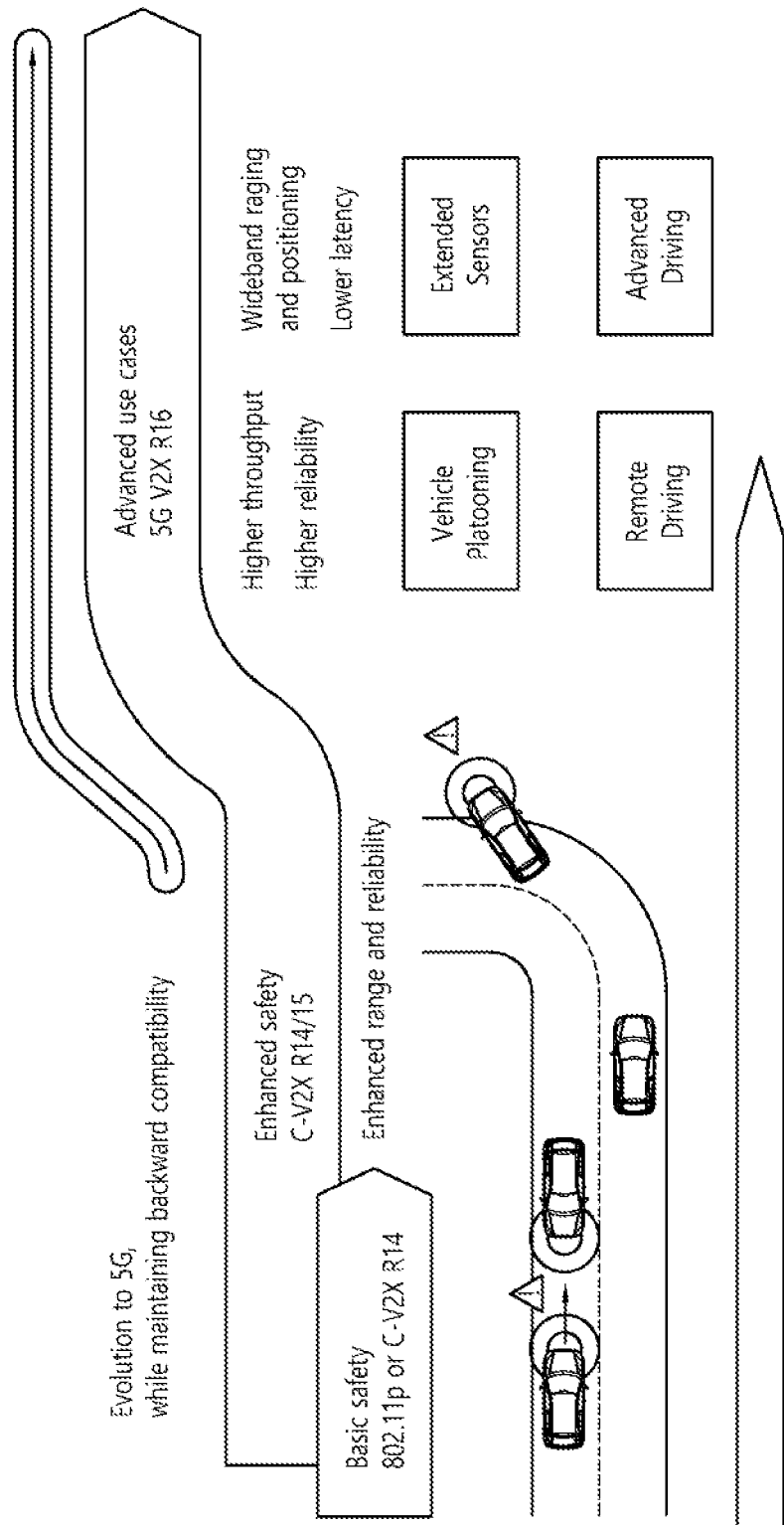
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
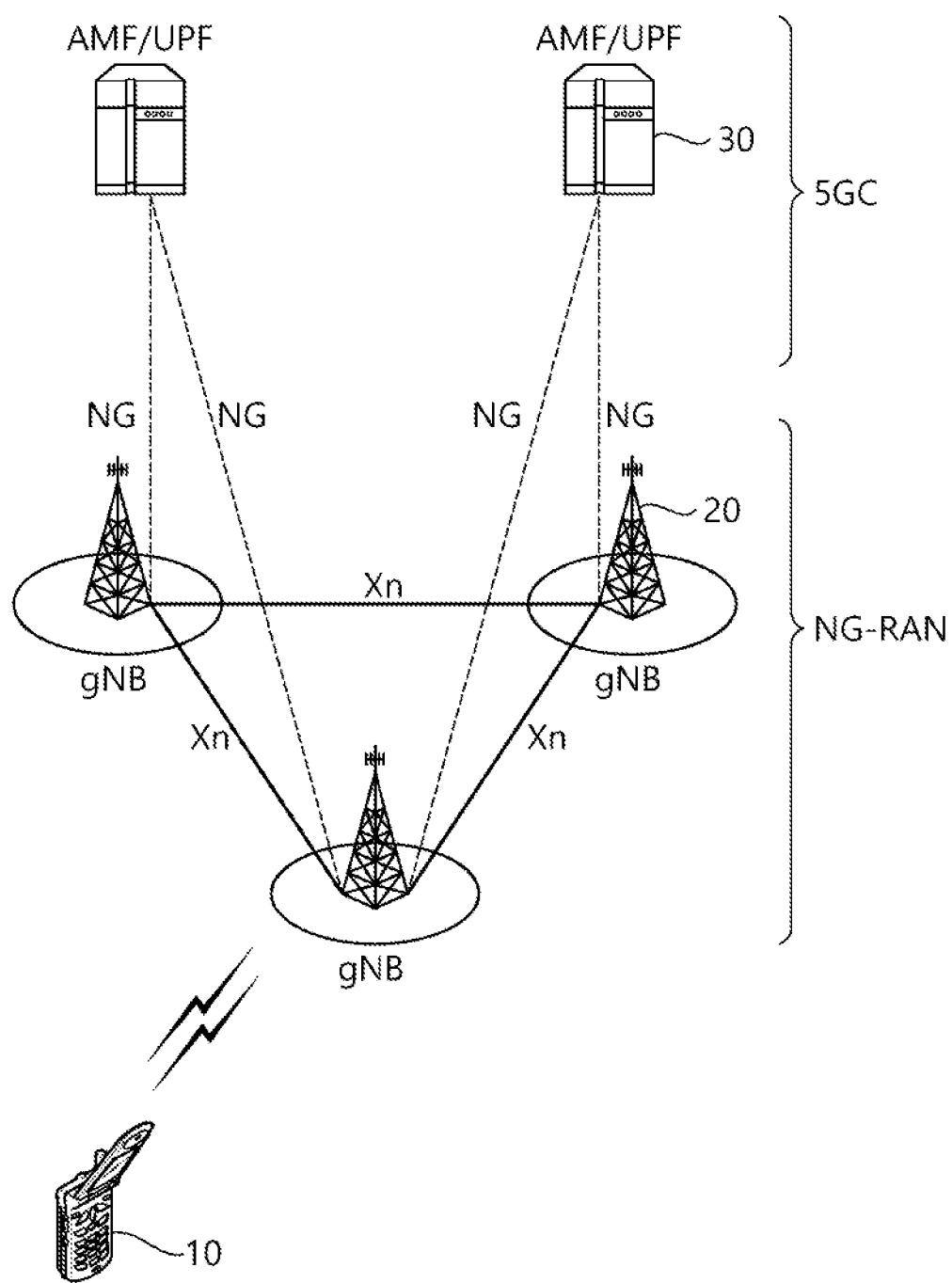
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
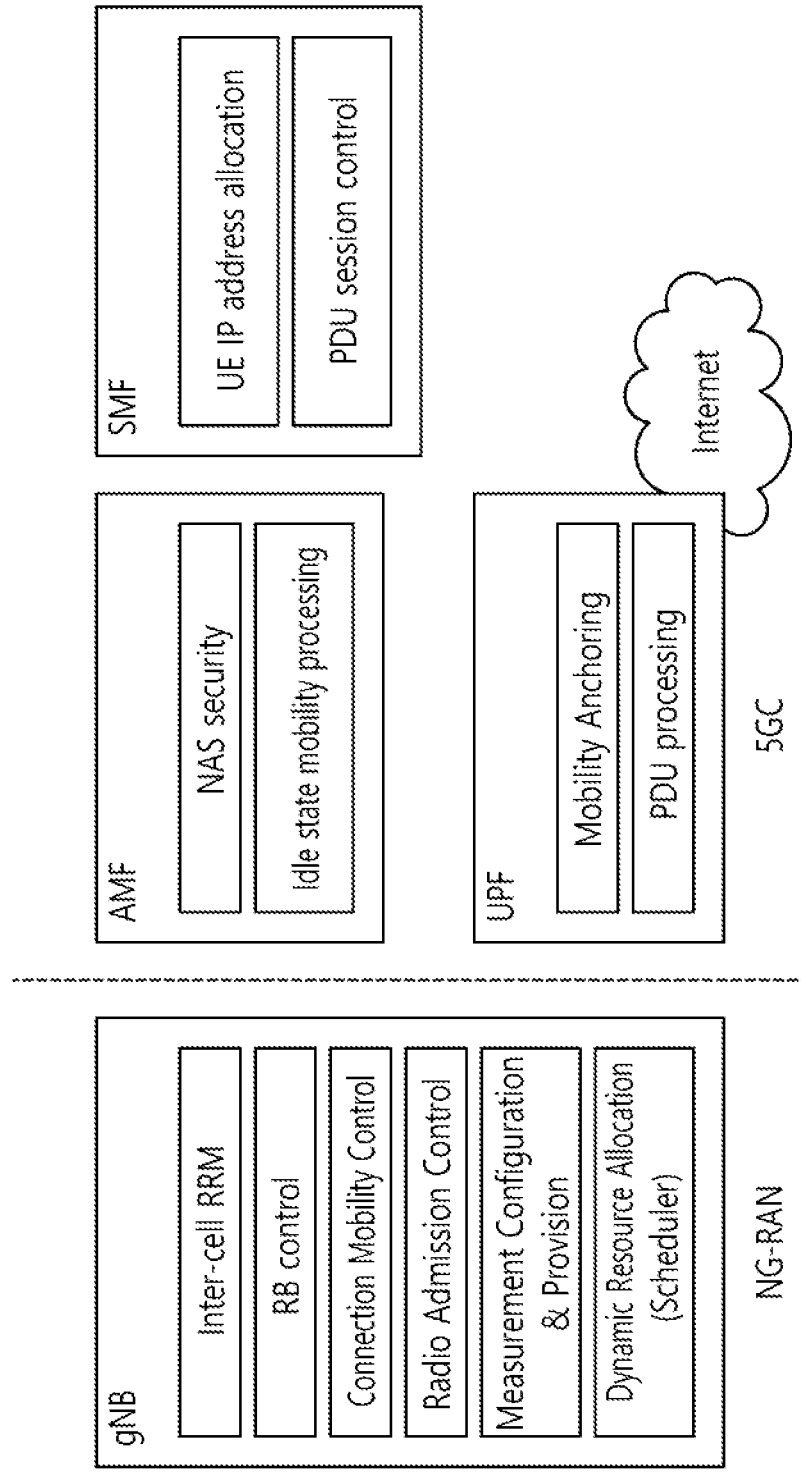
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
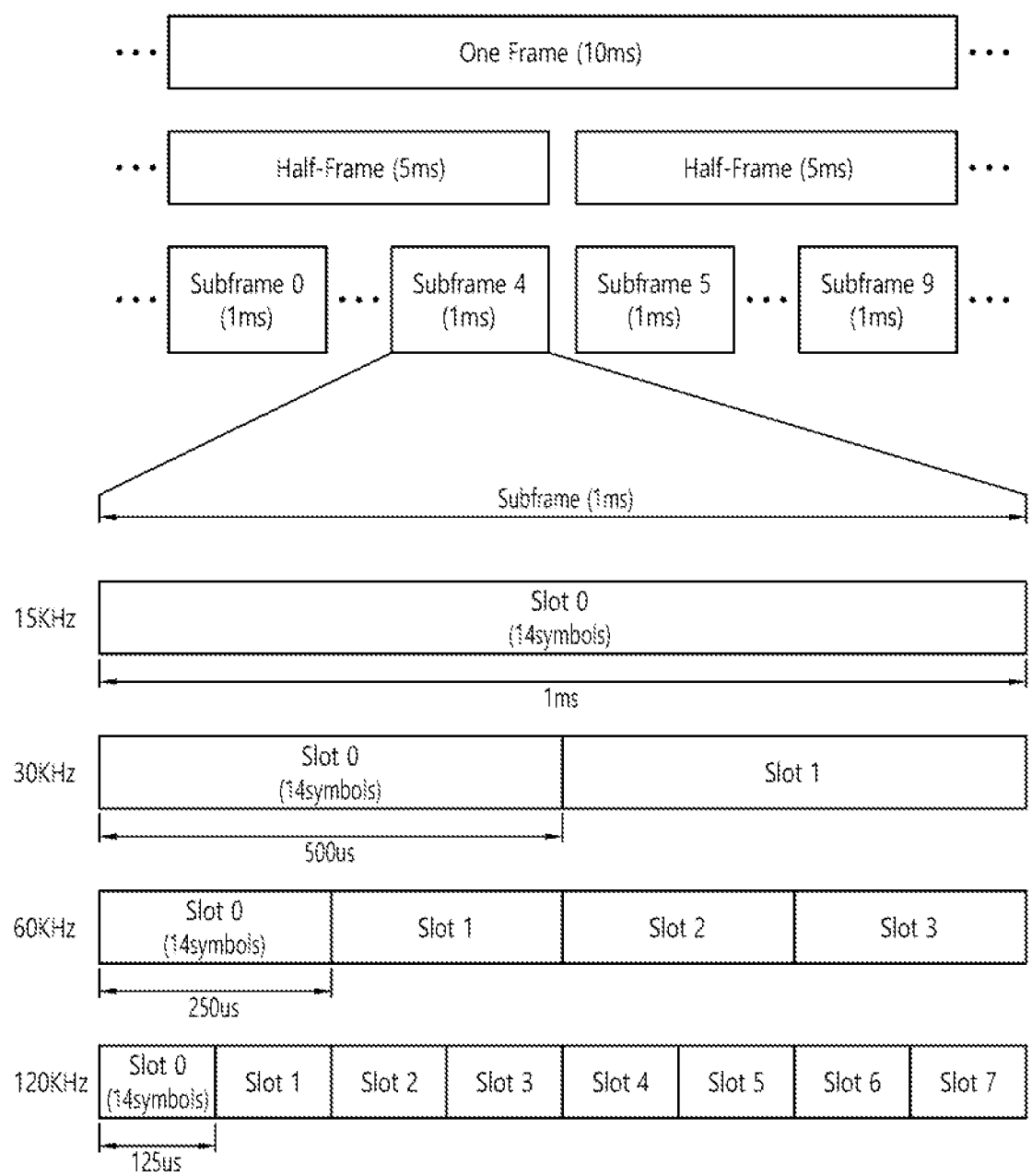
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
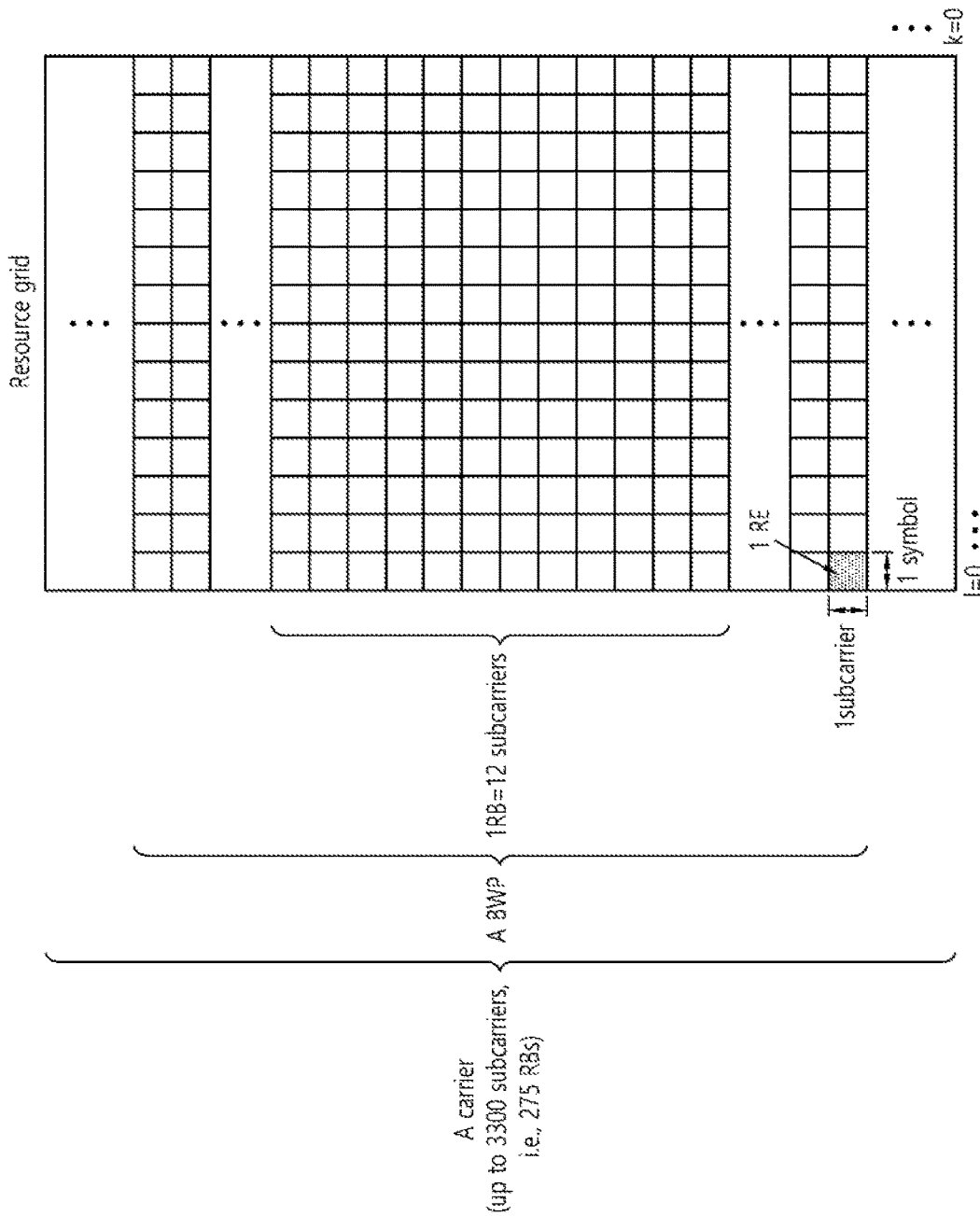
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
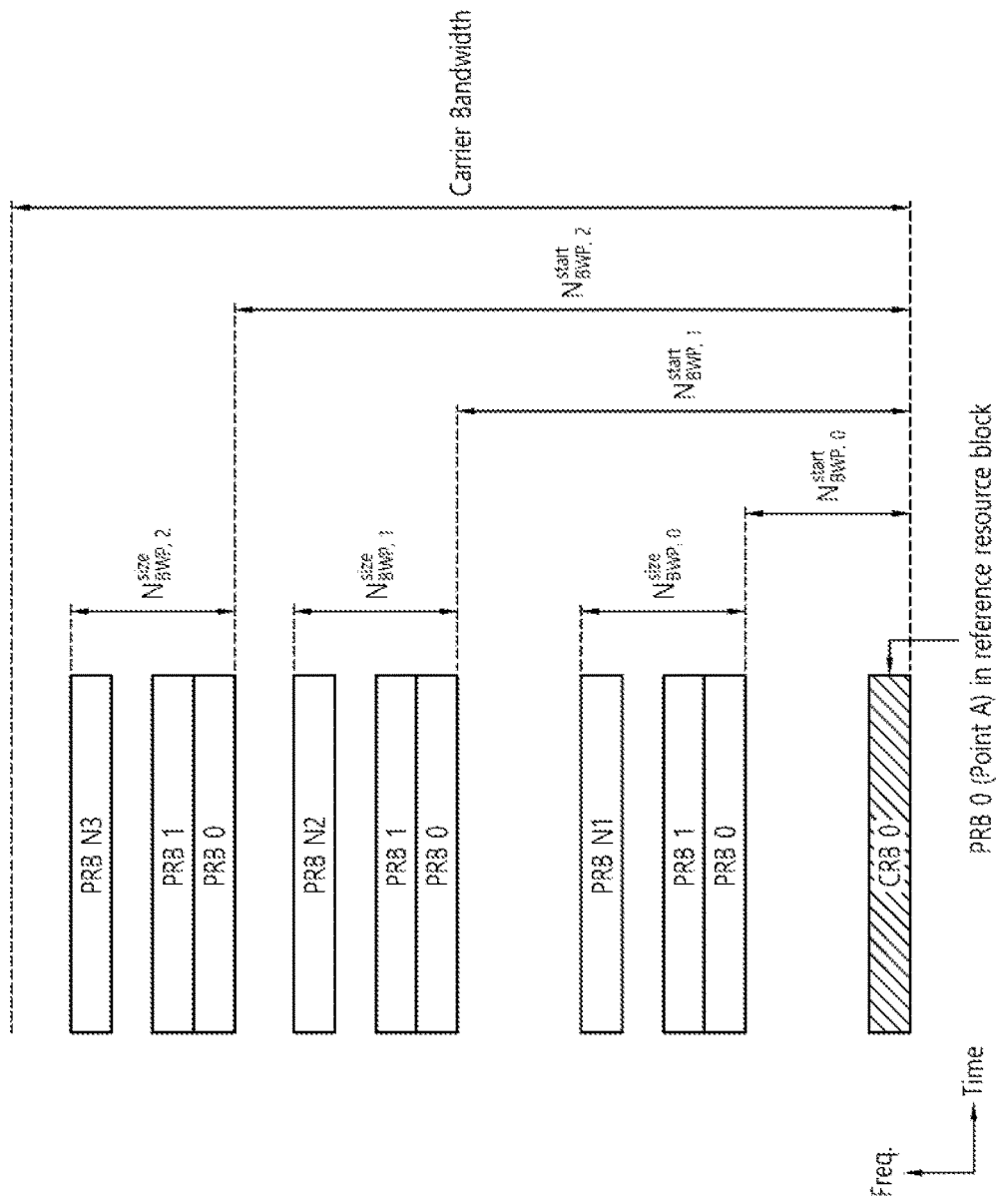
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
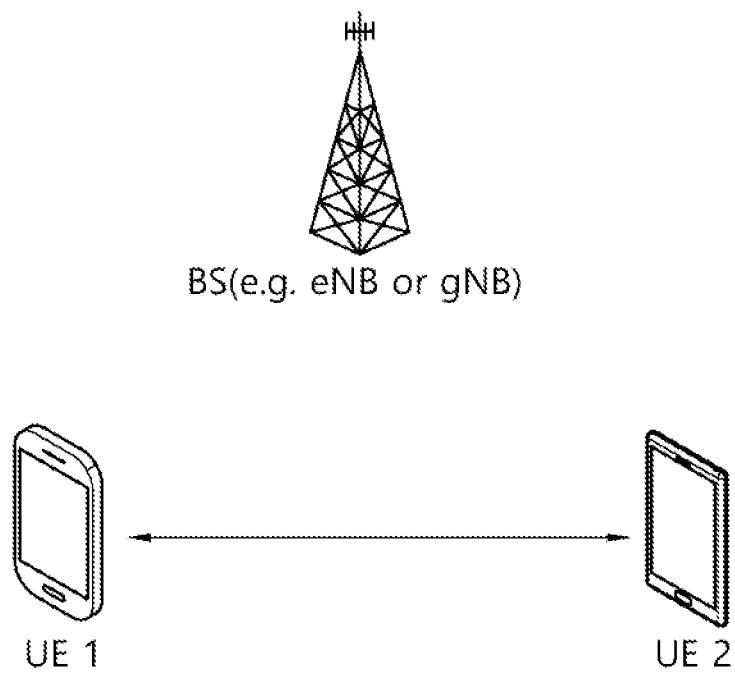
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
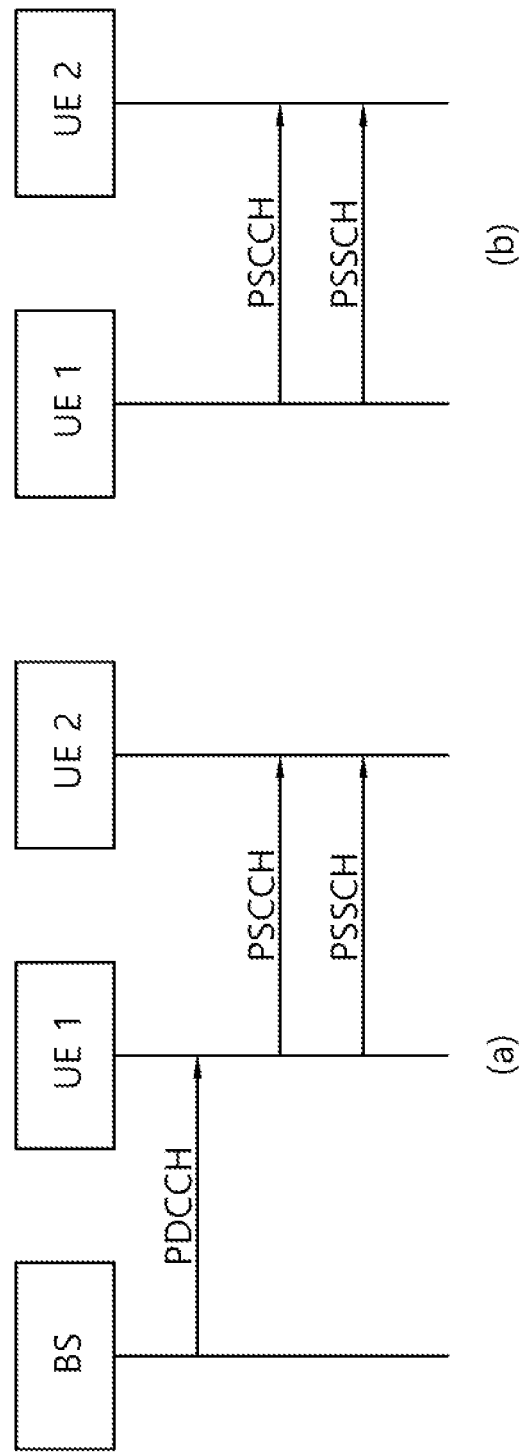
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSS CH.

Figure 11:
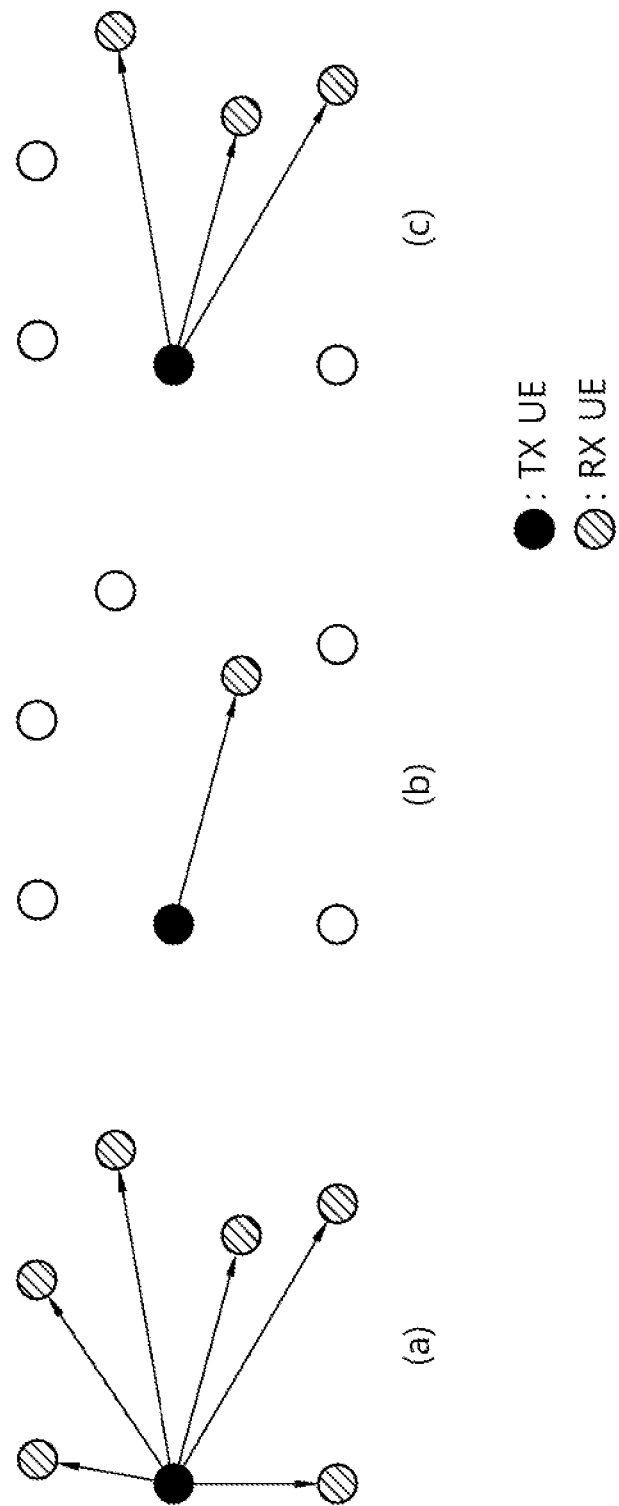
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) reference signal received power (RSRP) (and/or SL (L1) reference signal received quality (RSRQ) and/or SL (L1) reference signal strength indicator (RSSI)) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI.

Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, the reservation resource and/or the selection resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering a report on sidelink channel state information/sidelink channel quality information (hereinafter, SL_CSI information) may be replaced/substituted with a sidelink channel state information reference signal (CSI-RS) reception.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 12:
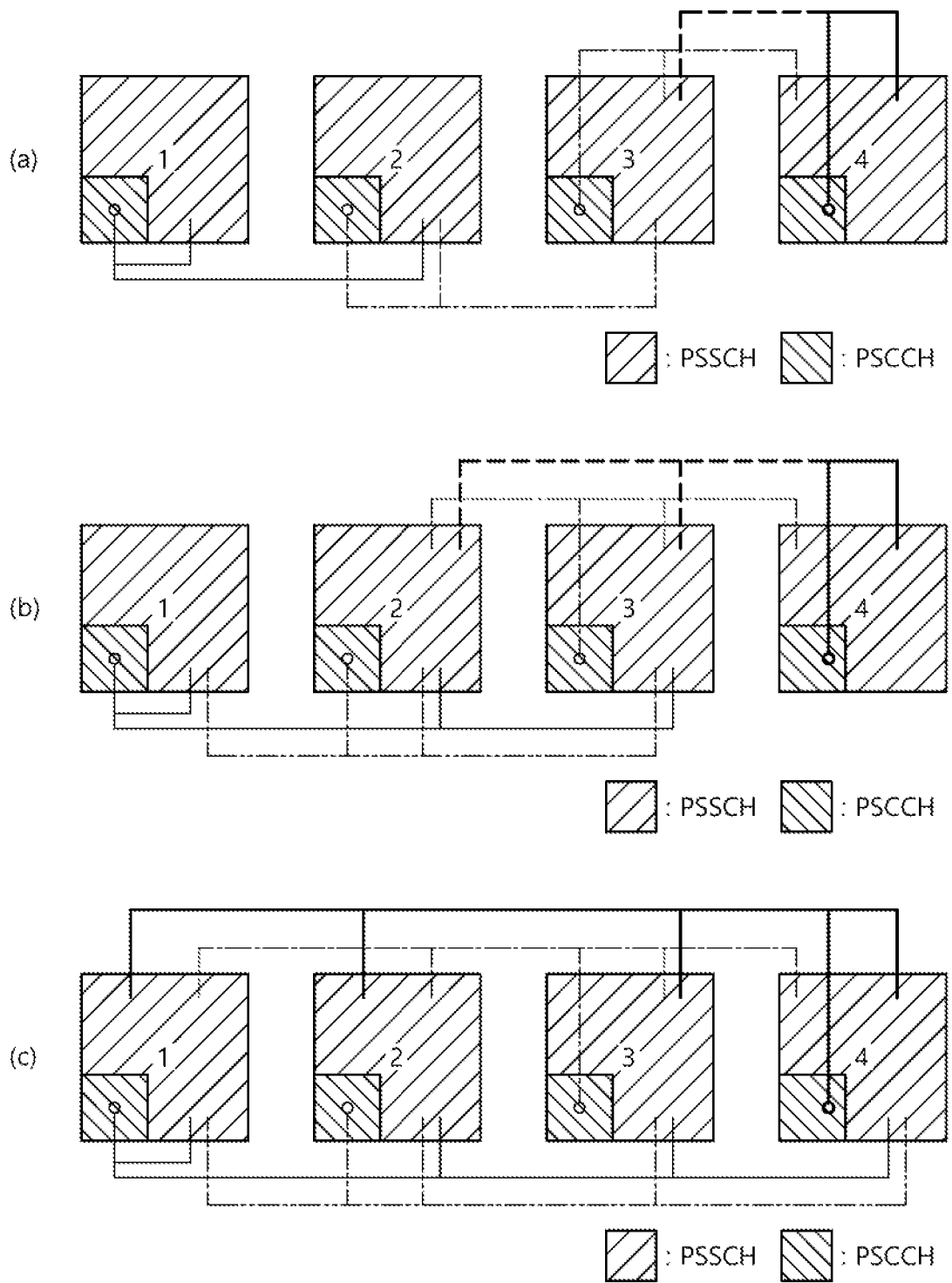
FIG. 12 shows a method in which a UE that has reserved transmission resource(s) informs another UE of the transmission resource(s), based on an embodiment of the present disclosure.

FIG. 12 shows a method in which a UE that has reserved transmission resource(s) informs another UE of the transmission resource(s), based on an embodiment of the present disclosure. The embodiment of FIG. 12 may be combined with various embodiments of the present disclosure.

Specifically, for example, (a) of FIG. 12 shows a method for performing by a transmitting UE chain-based resource reservation by transmitting/signaling location information of (maximum) 2 transmission resources to receiving UE(s) through one SCI, in the case of a value of K=4. For example, (b) of FIG. 12 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 12, the transmitting UE may transmit/signal only location information of the fourth transmission-related resource to the receiving UE(s) through the fourth (or last) transmission-related PSCCH. For example, referring to (a) of FIG. 12, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 12, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 12, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 12, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 12 shows a method for performing by the transmitting UE block-based resource reservation, by signaling location information of 4 transmission resources to receiving UE(s) through one SCI, in the case of a value of K=4.

Meanwhile, for example, since the base station cannot determine how many resources the mode 1 transmitting UE requires for MAC PDU transmission with HARQ feedback disabled, mode 1 resource allocation/scheduling may be inefficient.

According to various embodiments of the present disclosure, when the mode 1 transmitting UE performs MAC PDU transmission with HARQ feedback disabled, if additional retransmission resources are not required, the transmitting UE may report ACK information to the base station through the PUCCH resource. Here, for example, the PUCCH resource may be a PUCCH resource related to the previous mode 1 resource.

Meanwhile, for example, due to the decoding and/or reception performance of the UE, since a size of the resource reservation period field on the SCI (hereinafter, RSV_BITNUM) is limited, a mapping relationship between a reservation period value of the selectable candidate resources configured/allowed for the UE resource pool specifically and a bit value for a reservation period field of a resource may be ambiguous.

According to various embodiments of the present disclosure, the base station/network may configure a candidate resource reservation period value that can be used/selectable in the resource pool for the UE, within a range not exceeding 2^{RSV_BITNUM}. In this case, for example, the candidate resource reservation period value configured for the UE may be sequentially mapped from the first candidate resource reservation period to the ascending status of the decimal value of the RSV_BITNUM bit.

Meanwhile, for example, the transmitting UE may perform initial transmission based on the mode 1 CG resource, and the transmitting UE may report a NACK to the base station through a CG-related PUCCH resource. Thereafter, when the transmitting UE is scheduled with retransmission resources through DG DCI, it may be ambiguous when the transmitting UE can expect retransmission resource scheduling related to the corresponding sidelink HARQ process or when the transmitting UE can flush the associated buffer.

Or, for example, the transmitting UE may perform initial transmission based on the mode 1 CG resource, and the transmitting UE may report a NACK to the base station through a CG-related PUCCH resource. Thereafter, the transmitting UE may perform retransmission based on the DG DCI received from the base station. At this time, for example, when the transmitting UE reports a NACK to the base station through the DG-related PUCCH resource for scheduling the retransmission resource, and then is scheduled with additional retransmission resources through the DG DCI, it may be ambiguous when the transmitting UE can expect DG-based retransmission resource scheduling related to the corresponding sidelink HARQ process or when the transmitting UE can flush the associated buffer.

According to various embodiments of the present disclosure, the DG DCI-based retransmission resource may be scheduled for the transmitting UE only up to a pre-configured time window from the CG resource of a specific period in which the initial transmission was performed. For example, the transmitting UE may perform DG DCI-based retransmission for a related sidelink HARQ process up to a pre-configured time window from the CG resource of a specific period in which the initial transmission was performed. Here, for example, the related sidelink HARQ process may be a sidelink HARQ process related to initial transmission performed by the transmitting UE through a CG resource of a specific period.

Also, for example, after the pre-configured time window, it may be configured for the transmitting UE to flush the buffer related to the associated sidelink HARQ process, or it may be configured to be allowed for the transmitting UE to flush the buffer related to the associated sidelink HARQ process. Here, for example, the associated sidelink HARQ process may be a sidelink HARQ process related to initial transmission performed by the transmitting UE through a CG resource of a specific period. That is, for example, the transmitting UE may flush a buffer related to the associated sidelink HARQ process regardless of whether or not NACK information is received from the receiving UE.

Meanwhile, for example, after the mode 1 transmitting UE receives ACK information from the receiving UE through the PSFCH, even though the mode 1 transmitting UE reports the ACK information to the base station through the PUCCH, the mode 1 transmitting UE may receive DG DCI scheduling retransmission resources related to the corresponding sidelink HARQ process from the base station. In this case, it may be ambiguous whether the mode 1 transmitting UE should perform PSCCH/PSSCH transmission or retransmission on the retransmission resource and what information to report to the base station through the DG-related PUCCH resource.

According to various embodiments of the present disclosure, after the mode 1 transmitting UE receives ACK information from the receiving UE through the PSFCH, even though the mode 1 transmitting UE reports the ACK information to the base station through the PUCCH, based on the base station misidentifying the ACK as the NACK, the mode 1 transmitting UE may receive a DG DCI scheduling retransmission resources from the base station. In this case, for example, the mode 1 transmitting UE may not perform PSCCH/PSSCH transmission on the corresponding retransmission resource. For example, the mode 1 transmitting UE may also report ACK information to the base station through the DG-related PUCCH resource.

Meanwhile, for example, a mode 2 transmitting UE may select a transmission resource based on sensing, and may signal reservation information related to the transmission resource through SCI. At this time, when actual packet transmission is not performed due to causes such as uplink/sidelink prioritization (UL/SL prioritization), LTE/NR sidelink prioritization, etc., if the packet transmission resource of another UE having a priority greater than or equal to a pre-configured threshold overlaps the corresponding transmission resource, it may be ambiguous whether to perform preemption check and reselection of transmission resource.

According to various embodiments of the present disclosure, when actual packet transmission is not performed on the reserved resource signaled by the transmitting UE through SCI, based on the priority of packet/data considered when performing sensing related to selection of the corresponding reserved resource, the transmitting UE may perform a preemption check and resource reselection determination for a reserved resource for which actual packet transmission is not performed. Alternatively, for example, the preemption check and resource reselection determination for the reserved resource signaled by the SCI may be performed when a packet (e.g., MAC PDU) to be transmitted through the corresponding reserved resource is available. That is, for example, the transmitting UE may perform the preemption check and resource reselection determination for the reserved resource signaled by the SCI when a packet (e.g., MAC PDU) to be transmitted through the corresponding reserved resource is available.

Meanwhile, according to an embodiment of the present disclosure, it may be configured for the UE so that a Channel occupancy Ratio (CR) calculation related to sidelink communication is performed. For example, the UE may perform CR calculation related to sidelink communication.

According to an embodiment, the UE may select a transmission resource based on internal sensing. Thereafter, before the UE transmits information related to the selected transmission resource to another UE through SCI, the UE may determine whether the selected transmission resource overlaps all or part of the transmission resource of the other UE. For example, when the selected transmission resource overlaps all or part of the transmission resource of another UE, the UE may reselect the transmission resource. For example, when the UE reselects a transmission resource, it may be configured for the UE so that the previously selected transmission resource is not included in the CR calculation. For example, when the UE reselects the transmission resource, it may be configured for the UE so that the previously selected transmission resource is included in the CR calculation.

Meanwhile, according to an embodiment of the present disclosure, a field related to period information of a reserved resource may be defined on the SCI. For example, the SCI may include a field related to period information of a reserved resource.

According to an embodiment, the size of a field related to period information of a reserved resource included in the SCI may be configured to X bits. The base station or the network may configure usable or selectable candidate period values in the resource pool to the UE. For example, the usable or selectable candidate period values in the resource pool may include values in a range not exceeding 2x among more than 2x candidate period values. For example, the base station or the network may configure usable or selectable candidate period values in the resource pool to the UE in a range that does not exceed 2x among more than 2x candidate period values. Here, for example, the base station or the network may configure N (e.g., N<$2^x$+1) number of the period (e.g., $P_1, P_2, P_3, \ldots, P_N$) of reserved resources to the UE. In this case, for example, from the first period $P_1$, it may be sequentially mapped to an ascending status of a decimal value of X bits (e.g., 0, 1, . . . , $2^x-1$). For example, $P_1$ may be mapped to the 0 state, $P_2$ be mapped to the 1 state, . . . , and $P_N$ may be mapped to the $2^x-1$ state, respectively.

Meanwhile, according to an embodiment of the present disclosure, in the case of operation related to mode 1 CG and/or DG, the UE may report sidelink HARQ feedback information to the base station through a pre-configured PUCCH. Thereafter, when the base station allocates an additional retransmission resource to the UE through DG, according to various embodiments below, the UE may figure out the linkage between the CG index and/or the CG resource on which the initial transmission was performed and the retransmission resource allocated through the DG. For example, when the UE reports NACK information to the base station through a pre-configured PUCCH, and the base station allocates an additional retransmission resource to the UE through DG, according to various embodiments below, the UE may determine the DG retransmission resource associated with the CG index and/or the CG resource, through linkage between the CG index and/or the CG resource on which the initial transmission was performed and the retransmission resource allocated through the DG.

According to an embodiment, on the DG DCI to which the retransmission resource is allocated, a PUCCH resource index indicator field (PRI FD) may be defined. Here, for example, PUCCH resource indexing may be allocated for a periodically appearing CG resource or a PUCCH resource configured according to a CG resource set, respectively. Specifically, for example, when the UE performs initial transmission based on a CG resource or CG resource set of a specific period, the UE may report a NACK to the base station through an associated PUCCH resource. In this case, the PRI FD value on the DG DCI to which the retransmission resource is allocated may be indicated by the index of the associated PUCCH resource. For example, when the UE performs initial transmission based on a CG resource or CG resource set of a specific period, the UE may report a NACK to the base station through a PUCCH resource associated with a CG resource or CG resource set of a specific period. For example, when the associated PUCCH resource index is X, the PRI FD value on the DG DCI to which the retransmission resource is allocated may be expressed as X.

According to an embodiment, when the UE performs initial transmission through a CG resource and an additional retransmission resource is allocated to the UE through the DG, the HARQ process ID field, not the CG index field, may be defined on the DCI related to the DG. For example, the DCI related to the DG may include a HARQ process ID field without including a CG index field indicating index information of a CG associated with the DG. Here, for example, both the CG index field and the HARQ process ID field may exist on the CG DCI, and HARQ process ID values may not overlap between different CGs. For example, the CG DCI may include a CG index field and a HARQ process ID field, and HARQ process ID values may not overlap between different CGs. For example, in order to remove ambiguity about the linkage between the CG resource and the associated DG retransmission resource, it may be configured so that the HARQ process ID values do not overlap between different CGs.

Meanwhile, according to an embodiment of the present disclosure, when the UE performs a pre-emption operation, the UE may reselect a transmission resource according to the following various embodiments. For example, when the UE shares information related to a transmission resource selected or reserved through SCI with another UE, when the resource related to transmission of a relatively higher priority packet overlaps with the selected or reserved transmission resource, the preemption operation may be operation of reselecting the selected or reserved resource or omitting transmission of the selected or reserved resource.

According to an embodiment, when packet transmission is not actually performed on a specific transmission resource shared by the UE through SCI, if the resource of a relatively high priority packet transmitted by another UE and all or part of the specific transmission resource overlaps, the overlapping transmission resource may be reselected. For example, if there is no actual transmission packet, the reference priority that the UE compares with the priority related to the packet of another UE may be considered the priority of the most recently transmitted packet on the selected or reserved resource shared through SCI. Or, for example, when there is no actual transmission packet, the reference priority that the UE compares with the priority related to the packet of another UE may be the priority of the packet considered when the UE performs sensing related to the selected or reserved resource shared through SCI. Or, for example, when there is no actual transmission packet, the reference priority that the UE compares with the priority related to the packet of another UE may be considered the highest priority of the service related to the selected or reserved resource shared by the UE through SCI. Alternatively, for example, when there is no actual transmission packet, the reference priority that the UE compares with the priority related to the packet of another UE may be considered the pre-configured priority.

According to an embodiment, when packet transmission is not actually performed on a specific transmission resource shared by the UE through SCI, if the resource of a relatively high priority packet transmitted by another UE and all or part of the specific transmission resource overlaps, the UE performs a release operation on the overlapping transmission resource, and the UE may reselect the actual transmission resource as a packet is generated or arrived in the buffer. For example, when packet transmission is not actually performed on a specific transmission resource shared by the UE through SCI, if the resource of a relatively high priority packet transmitted by another UE and all or part of the specific transmission resource overlaps, the UE performs a cancel operation on the existing sidelink grant, and the UE may reselect the actual transmission resource as a packet is generated or arrived in the buffer.

According to an embodiment, when a relatively low priority packet transmission has already occupied or reserved a resource through an initial sensing operation, the preemption operation may be an operation in which transmission of a relatively high priority packet occupies or reserves a resource overlapping all or part of the occupied or reserved resource, thereby protecting the transmission of a relatively high priority packet. That is, for example, the RSRP threshold associated with preemption may be configured differently from the sidelink RSRP threshold associated with sensing. Here, for example, the RSRP threshold associated with preemption may include an RSRP threshold associated with preemption triggering. Here, for example, the sidelink RSRP threshold value related to sensing may be the final sidelink RSRP threshold value related to the initial sensing or the sidelink RSRP threshold value configured from the base station or the network.

Or, for example, when the UE performing the transmission of the relatively low priority packet performs initial sensing, the preemption operation may be an operation in which the UE fails to detect or sense transmission of a relatively high priority packet, and then, the UE determines that the transmission resource of a relatively high priority packet and all or part of its transmission resource overlaps, thereby protecting transmission of a relatively high priority packet. That is, for example, the RSRP threshold associated with preemption may be configured to be the same as the sidelink RSRP threshold associated with sensing. Here, for example, the RSRP threshold associated with preemption may include an RSRP threshold associated with preemption triggering. Here, for example, the sidelink RSRP threshold value related to sensing may be the final sidelink RSRP threshold value related to the initial sensing or the sidelink RSRP threshold value configured from the base station or the network.

According to an embodiment, when the UE performs preemption-based resource reselection, the UE may perform resource reselection by using the final sidelink RSRP threshold used during initial sensing. For example, the final sidelink RSRP threshold may be a value obtained by increasing the sidelink RSRP threshold (e.g., increasing the sidelink RSRP threshold by 3 DB) in order to secure the candidate number of selectable transmission resources greater than or equal to a pre-configured number or pre-configured ratio within the selection window.

Or, for example, when the UE performs preemption-based resource reselection, the UE may perform resource reselection by using a sidelink RSRP threshold related to initial sensing pre-configured from a base station or a network. For example, when the UE performs preemption-based resource reselection, the UE may perform resource reselection a sidelink RSRP threshold value related to initial sensing pre-configured from a base station or network rather than a final sidelink RSRP threshold related to initial sensing.

Meanwhile, according to an embodiment of the present disclosure, when the number of RBs related to the sidelink BWP (BW_RBNUM) is greater than the number of RBs configurable as a frequency resource of the resource pool (RP_RBNUM), in order to increase the resource usage rate, the following various embodiments may be applied. Here, for example, the RP_RBNUM value may be the product of the number of RBs constituting a subchannel (SUB_RBNUM) and the number of subchannels in the resource pool (SUB_NUM) (i.e., RP_RBNUM=SUB_RBNUM×SUB_NUM). Also, in the present disclosure, for convenience of description, a difference value between BW_RBNUM and RP_RBNUM may be referred to as X_VAL.

According to an embodiment, a subchannel of a low index may include all RBs corresponding to X_VAL. A subchannel of a high index may include all RBs corresponding to X_VAL. For example, a subchannel of a pre-configured index may include all RBs corresponding to X_VAL. Alternatively, for example, in the ascending order of the index from the subchannel of the lowest index, the subchannel may be configured to include the number of FLOOR (X_VAL/SUB_NUM) or CEILING (X_VAL/SUB_NUM) number of RBs. For example, in the descending order of the index from the subchannel of the highest index, the subchannel may be configured to include the number of FLOOR (X_VAL/SUB_NUM) or CEILING (X_VAL/SUB_NUM) number of RBs.

For example, when the above-described embodiment is applied, subchannels having different RB numbers may exist in the resource pool, and the TBS value may be configured to be derived based on the subchannel of SUB_RBNUM. Also, for example, when the size of a subchannel used between initial transmission and retransmission is different, the TBS value may be configured to always be derived or assumed as an initial transmission-related parameter (e.g., the number of RBs, MCS). For example, the TBS value may be determined by a combination of the MCS and the number of RBs. For example, the TBS value may be configured to always be derived or assumed based on the subchannel of SUB_RBNUM to which the number of RBs is not added. Or, for example, when the size of the subchannel used between the initial transmission and the retransmission is different, the TBS value may be configured to be derived or assumed based on the subchannel having the smallest number of RBs among the subchannels related to the initial transmission and the retransmission. Or, for example, when the size of the subchannel used between the initial transmission and the retransmission is different, the TBS value may be configured to be derived or assumed based on the subchannel having the largest number of RBs among the subchannels related to the initial transmission and the retransmission. Or, for example, when the size of a subchannel used between initial transmission and retransmission is different, the TBS value may be configured to be derived or assumed based on the average number of RBs of subchannels related to initial transmission and retransmission.

Meanwhile, according to an embodiment of the present disclosure, a PDB or latency budget value related to SL CSI reporting may be determined or selected through predefined signaling (e.g., PC5 RRC) between UEs. For example, T_VAL may include a PDB or latency budget related to SL CSI reporting. In this case, for example, since the base station of the mode 1 UE performing the SL CSI reporting operation does not have information on the T_VAL value, the base station may not be able to allocate a mode 1 resource satisfying the T_VAL value. In order to solve this problem, for example, a mode 1 UE performing an SL CSI reporting operation may report T_VAL information related to a SL SCI report determined or selected between a pair of UE to the base station through predefined signaling (e.g., SL UE assistance information).

Meanwhile, according to an embodiment of the present disclosure, in the case of SL CSI MAC CE, priority information signaled on SCI and priority information considered by a higher layer (e.g., MAC, RLC, PDCP) may be different. In this case, according to the following embodiment, PHY parameter adjustment based on congestion control (e.g., maximum allowable transmit power, allowed number of retransmissions, selectable MCS range, number of allowed RBs related to transmission, et.) may be performed or applied.

According to an embodiment, in the case of SL CSI MAC CE, PHY parameter adjustment based on congestion control may be applied based on priority information considered by a higher layer (e.g., MAC, RLC, PDCP) differently from PSSCH/PSCCH. Alternatively, for example, PHY parameter adjustment based on congestion control may be applied based on priority information signaled on SCI.

Meanwhile, according to an embodiment of the present disclosure, in the case of the mode 1 CG operation, the UE may perform retransmission for the initial transmission according to the following various embodiments. Here, for example, it may be configured to operate or use only one HARQ process or HARQ process ID for each CG. For example, it may be configured to operate or use only one sidelink HARQ process or HARQ process ID for each CG. For example, the number of HARQ processes or HARQ process IDs that can be operated or used for each CG and/or DG may be configured from the base station/network. For example, the maximum number of sidelink HARQ processes or HARQ process IDs that can be operated or used for each CG and/or DG may be configured from the base station/network. For example, the HARQ process ID or the sidelink HARQ process ID may be configured not to overlap between the CG and the DG.

According to an embodiment, when the UE performs initial transmission on a CG resource of a specific period, the UE may perform retransmission operation related to the initial transmission (e.g., the UE may report SL HARQ feedback information to the base station through PUCCH, and may be allocated retransmission resources from the base station through DG) until CG resources of the next cycle appears. Or, for example, when the UE performs initial transmission on a CG resource of a specific period, the UE may perform retransmission operation related to the initial transmission until a pre-configured time window or until a pre-configured timer is completed. Or, for example, when the UE performs initial transmission on a CG resource of a specific period, the UE may perform retransmission operation related to the initial transmission for a pre-configured number/interval (e.g., the number of DG transmissions for allocating retransmission resources, or the number of CG cycles). For example, when the above embodiment is applied, the maximum allowable number of retransmissions per priority per CG may be counted only up to the section in which the retransmission operation is performed, and may be initialized again. For example, when the above embodiment is applied, the maximum allowable number of retransmissions per CG and/or the maximum allowable number of retransmissions per priority may be counted only up to a section in which a retransmission operation is performed, and may be initialized again. Here, for example, when the period in which the retransmission operation is performed has elapsed, the transmitting UE may flush its buffer. For example, after a period in which the retransmission operation is performed, the transmitting UE may flush its buffer regardless of receiving a NACK from the receiving UE.

According to an embodiment, in the case of mode 1 CG, the base station may allocate an additional retransmission resource to the transmitting UE through DG, and the transmitting UE receives ACK information from the receiving UE, whereby the retransmission resource of the transmitting UE may be released. For example, the released retransmission resource may not appear/invalid in the next CG period. Also, for example, when the base station allocates an additional retransmission resource to the transmitting UE through DG with respect to a resource of a specific CG period, the retransmission resource may appear for a resource of a subsequent CG period, respectively. Or, for example, the retransmission resource may appear limitedly only for the resource of the corresponding CG period.

According to an embodiment, if a plurality of sidelink HARQ processes are operated based on CG resources, when the transmitting UE reports sidelink HARQ feedback information to the base station through PUCCH, the transmitting UE may also report the associated sidelink HARQ process ID information. For example, if a plurality of sidelink HARQ processes are operated based on CG resources, the transmitting UE may report sidelink HARQ feedback information and sidelink HARQ process ID information to the base station through PUCCH. Here, for example, on the DG DCI for allocating retransmission resources, a CG index information field and a sidelink HARQ process ID information field may be defined. For example, the DG DCI for allocating retransmission resources may include a field related to CG index information and a field related to sidelink HARQ process ID information. According to another embodiment, the retransmission resource allocated through the DG DCI may be shared among a plurality of sidelink HARQ processes. For example, in particular, since the UE reports only 1 bit to the base station through the PUCCH, when SL HARQ feedback information related to a plurality of sidelink HARQ processes is bundled, the retransmission resource allocated through the DG DCI may be shared between the plurality of sidelink HARQ processes. For example, when the above-described embodiment is applied or when a plurality of sidelink HARQ processes are operated based on CG resources, the retransmission resource allocated through the DG DCI may be shared among a plurality of sidelink HARQ processes for which a NACK is reported (e.g., it may be limited to a sidelink HARQ process related to the same CG). For example, in particular, since the UE reports only 1 bit to the base station through the PUCCH, it may be applied when SL HARQ feedback information related to a plurality of sidelink HARQ processes is bundled.

Meanwhile, according to an embodiment of the present disclosure, when the mode 1 transmitting UE reports ACK information received from the receiving UE to the base station through the pre-configured PUCCH resource, due to the occurrence of an ACK-TO-NACK error, and if the base station misinterprets the ACK information as NACK information and allocates a retransmission resource via DG to the transmitting UE, the following embodiments may be applied.

According to an embodiment, the transmitting UE may report ACK information to the base station through the PUCCH resource indicated by the DG DCI without actually performing retransmission through the retransmission resource allocated through the DG.

According to an embodiment, the transmitting UE may use the retransmission resource allocated through the DG for new TB transmission. For example, the receiving UE may distinguish whether a new TB is transmitted or not based on the sidelink HARQ process ID information and the NDI information on the SCI.

According to an embodiment, when the transmitting UE is configured with a PUCCH-based sidelink HARQ feedback report, even if the transmitting UE receives ACK information from the receiving UE through the PSFCH, the transmitting UE may be configured not to flush its own buffer for a pre-configured period/timer. Or, for example, if the transmitting UE is configured with a PUCCH-based sidelink HARQ feedback report, even if the transmitting UE receives ACK information from the receiving UE through the PSFCH, the transmitting UE may be configured not to flush its own buffer until receiving a DG (for allocating retransmission resources) containing the same HARQ process ID and/or CG index information and toggled NDI information. For example, even when unnecessary retransmission resources are allocated to the transmitting UE through DG due to an ACK-TO-NACK error, in order for the transmitting UE to perform retransmission to the receiving UE, the transmitting UE may not flush its own buffer for a pre-configured period/timer. Or, the transmitting UE may not flush its own buffer until receiving a DG (for allocating retransmission resources) containing the same HARQ process ID and/or CG index information and toggled NDI information Meanwhile, according to an embodiment of the present disclosure, when the transmitting UE reserves a plurality of retransmission resources for a potential retransmission operation, the transmitting UE may receive ACK information from the receiving UE. At this time, if the transmitting UE releases the remaining retransmission resources, the transmitting UE may perform counting of the number of retransmissions per TB or counting of the number of retransmissions per priority according to the following various embodiments.

According to an embodiment, the transmitting UE may assume that the retransmission operation is performed on the remaining transmission retransmission resources, and the transmitting UE may perform counting of the number of retransmissions per TB or counting of the number of retransmissions per priority considering the released remaining transmission retransmission resources. Or, for example, the transmitting UE may not consider the released remaining retransmission resources in counting the number of retransmissions per TB or counting the number of retransmissions per priority. For example, since the transmitting UE has already signaled that it has reserved the corresponding resource through SCI to another UE, the transmitting UE may assume that the retransmission operation is performed on the remaining transmission retransmission resources, and the transmitting UE may perform counting of the number of retransmissions per TB or counting of the number of retransmissions per priority considering the released remaining transmission retransmission resources.

According to another embodiment, when the transmitting UE fails to perform actual transmission or retransmission on a reserved or selected resource for a specific TB due to a collision between uplink transmission and/or sidelink transmission, etc., the transmitting UE may reflect the failure to perform actual transmission or retransmission on the reserved or selected resource in counting the number of retransmissions per TB or counting the number of retransmissions per priority. Or, for example, when the transmitting UE fails to perform actual transmission or retransmission on a reserved or selected resource for a specific TB due to a collision between uplink transmission and/or sidelink transmission, etc., the transmitting UE may not reflect the failure to perform actual transmission or retransmission on the reserved or selected resource in counting the number of retransmissions per TB or counting the number of retransmissions per priority.

Meanwhile, according to an embodiment of the present disclosure, the total number of sidelink HARQ processes (e.g., K) that the UE can operate may be more than the number of statuses that can be indicated by the sidelink HARQ process ID field on the SCI. In this case, according to the following various embodiments, the UE may be configured to operate the sidelink HARQ process.

According to an embodiment, when the UE is operating a plurality of sessions, the maximum number of sidelink HARQ processes that can be used/allocated to one session may be limited to the number of statuses that can be indicated by the sidelink HARQ process ID field on the SCI, or may be limited to a pre-configured maximum number value.

According to an embodiment, the index related to the entire sidelink HARQ processes that the UE can operate may have a value from 0 to (K−1), but since the number of sidelink HARQ process indexes and/or sidelink HARQ processes (e.g., indexes from 0 to 7 may be expressed) that can be expressed by the sidelink HARQ process ID field (e.g., 3 bits) on the SCI is smaller than the index related to the entire sidelink HARQ processes that the UE can operate, the value of the sidelink HARQ process ID field on the SCI may be determined through the operation of MOD (X, 8). Here, for example, X may mean an index from 0 to (K−1). For example, MOD (A, B) may be a function that derives the remainder of dividing A by B.

According to an embodiment, the mode 1 UE may report, to the base station, information on the total number of sidelink HARQ processes that can be operated and/or information on the size of a soft buffer related to its own sidelink communication as capability information. Here, for example, the size of the HARQ process ID field on mode 1 DCI (e.g., DG or CG) may be determined or configured based on the capability information.

According to an embodiment, if mode 1 CG operation is performed, when it is configured for the UE to report PUCCH-based sidelink HARQ feedback information (e.g., in particular, when only 1 bit is reported through PUCCH), one sidelink HARQ process or sidelink HARQ process ID per CG may be operated or used. For example, when mode 1 CG operation is performed, when it is not configured for the UE to report PUCCH-based sidelink HARQ feedback information (e.g., in particular, when only 1 bit is reported through PUCCH), the number of sidelink HARQ processes or sidelink HARQ process IDs per CG operated or used may be determined by the UE implementation. That is, for example, the UE may independently determine whether to operate or use a plurality of sidelink HARQ processes or sidelink HARQ process IDs for a specific CG. Alternatively, for example, the maximum number of allowed sidelink HARQ process per CG or the maximum number of allowed sidelink HARQ process IDs operated or used may be per-configured.

Meanwhile, according to an embodiment of the present disclosure, when the UE performs CR evaluation, the base station or the network may signal to the UE information on at least to what extent a future time interval and/or a past time interval will be included among a pre-configured CR evaluation window. For example, when the UE performs CR evaluation, the base station or the network may signal the UE information on at least to what extent the future time interval related to the resource reserved by the UE and/or the past time interval related to the resource reserved by the UE will be included among the pre-configured CR evaluation window. Or, for example, when the UE performs CR evaluation, the base station or the network may signal to the UE information on how much of the future time interval and/or the past time interval to be included among the pre-configured CR evaluation window as much as possible. For example, when the UE performs CR evaluation, the base station or the network may signal to the UE information on how much of the future time interval related to the resource reserved by the UE and/or the past time interval related to the resource reserved by the UE to be included among the pre-configured CR evaluation window as much as possible. Here, for example, the length of the time interval may be specifically or independently configured for at least one of the service type, service priority, cast type (e.g., unicast, groupcast, broadcast), message generation type (e.g., periodic, aperiodic) and QoS requirements (e.g., latency, reliability).

For example, the base station or the network may signal to the UE information on the minimum future time interval and/or the minimum past time interval among the pre-configured CR evaluation window. Alternatively, for example, the base station or the network may signal to the UE information on the maximum future time interval and/or the maximum past time interval among the pre-configured CR evaluation window.

Meanwhile, according to an embodiment of the present disclosure, when the UE reserves additional transmission resources or retransmission resources, based on the last transmission resource signaled by the previous SCI or the pre-configured X-th resource, the UE may constitute a selection window for selecting additional transmission resources or retransmission resources. Here, for example, the selection window may have a pre-configured size (e.g., a range within 31 slots or 32 slots). Here, for example, the UE may select additional transmission resources or retransmission resources from among the resources within the selection window after the time of the last transmission resource signaled by the previous SCI or the pre-configured X-th resource. Also, for example, the UE may select additional transmission resources or additional retransmission resources within the selection window, except for slots related to transmission resources previously signaled by SCI.

Meanwhile, according to an embodiment of the present disclosure, when the UE selects three transmission resources, the UE may preferentially randomly select the first transmission resource from among the sensing-based selectable candidate resources within the selection window. Thereafter, the UE may additionally select two transmission resources within a pre-configured time window (e.g., 32 slots) based on the selected first transmission resource. Here, for example, when the UE additionally selects two transmission resources, from among the selectable candidate resources on the remaining slots within the selection window, except for the slot related to the selected first transmission resource, until both the selected first transmission resource and the remaining two transmission resources can be included within the pre-configured time window, the UE may repeat random selection for two transmission resources. In addition, for example, based on the above rule, after the UE completes the selection of three transmission resources, the UE may select an additional transmission resource based on the second transmission resource or the last resource signaled by SCI or the pre-configured X-th transmission resource. In this case, the additionally selected transmission resource may be located before the third transmission resource signaled by SCI. For example, in the case of a service requiring low latency, based on the above rule, after the UE completes selection of three transmission resources, the UE may select an additional transmission resource based on the second transmission resource or the last resource signaled by SCI or the pre-configured X-th transmission resource. In this case, some of the additionally selected transmission resources may be located before the third transmission resource signaled by SCI.

Here, for example, in order to include a PSFCH resource or a PSFCH slot between the transmission resources (e.g., transmission resource A and transmission resource B) to be selected by the UE, after the UE randomly selects the transmission resource A, the UE may select the transmission resource B from among resources after the pre-configured N slots or the pre-configured N symbols from the nearest PSFCH resource or PSFCH slot that appears after the pre-configured M slots based on the time of the transmission resource A. For example, the pre-configured M slots may include a processing time for PSSCH/PSCCH reception and a preparation time for PSFCH transmission. For example, the pre-configured N slots or the pre-configured N symbols may include a processing time for PSFCH reception and a preparation time for PSSCH/PSCCH retransmission. Or, for example, the UE may select a transmission resource A from among resources before M slots from a PSFCH resource or the PSFCH slot, within a pre-configured time window (e.g., 32) based on the PSFCH resource or the PSFCH slot. Thereafter, the UE may select a transmission resource B from among resources after N slots or N symbols from a PSFCH resource or a PSFCH slot. Here, for example, the selected transmission resource A or transmission resource B and the PSFCH resource or PSFCH slot may be included in a pre-configured time window (e.g., 32). For example, the selected transmission resource A and transmission resource B and the PSFCH resource or PSFCH slot may all be included in a pre-configured time window (e.g., 32).

Meanwhile, according to an embodiment of the present disclosure, when the mode 1 transmitting UE performs a specific TB transmission on a sidelink transmission resource scheduled from the base station, according to a predefined rule, an operation related to the TB transmission may be omitted. In this case, for example, the mode 1 transmitting UE may report NACK information to the base station through the PUCCH resource, and may be allocated an additional retransmission resource from the base station. Here, for example, according to above the rule, when uplink transmission and/or downlink reception and sidelink transmission #X overlap in the time domain, operations related to sidelink transmission #X may be omitted based on comparing the priorities of associated logical channels. And/or, for example, when uplink transmission and/or sidelink transmission #X and sidelink transmission #Y on different carriers overlap in the time domain, and when transmit power is first allocated to uplink transmission and/or sidelink transmission #X based on comparing the priorities of the associated logical channels, since there is no remaining transmit power that can be allocated for sidelink transmission #Y, the operation related to sidelink transmission #Y may be omitted. Here, for example, the rule may be applied when the UE normally performs TB-related initial transmission and omits the retransmission operation, on the mode 1 SL transmission resource. For example, the resource allocated to the UE through the PUCCH-based NACK information report may be considered to additionally perform the omitted retransmission. For example, the rule may be applied to packet transmission or service transmission of a priority higher than a pre-configured threshold value and/or a QoS requirement (e.g., latency, reliability) tighter than a pre-configured threshold value, and/or mode 1 CG/DG-based packet transmission or service transmission. For example, the rule may be applied when a congestion level (e.g., a CBR measurement value) of the resource pool is lower than a pre-configured threshold value. For example, the rule may be applied when a congestion level (e.g., a CBR measurement value) of the resource pool is higher than a pre-configured threshold value.

Meanwhile, according to an embodiment of the present disclosure, in order to efficiently support a service having a minimum communication range requirement, a TX-RX distance-based feedback operation for transmitting only NACK may be performed or configured. For example, in order to efficiently support a service having a minimum communication range requirement, the UE may perform group cast option 1 based on the distance between the transmitting UE and the receiving UE (e.g., NACK (no acknowledgment) information is transmitted to the transmitting UE only when the receiving UE fails to decode/receive the PSSCH received from the transmitting UE). In such a case, for example, when the receiving UE cannot know its location information and/or when the accuracy of its location information is lower than a pre-configured threshold value, the receiving UE may not perform the PSFCH transmission (i.e., sidelink HARQ feedback information transmission) to the transmitting UE. Here, for example, when the operation of the group cast option 1 is applied, according to the above rule, when the PSFCH transmission is not performed, it may be considered that the receiving UE transmits ACK information to the transmitting UE.

Meanwhile, according to an embodiment of the present disclosure, when a base station signals a mode 1 grant to the transmitting UE, an associated PUCCH resource may be allocated or scheduled for the transmitting UE. Thereafter, when the transmitting UE performs transmission without requesting or receiving sidelink HARQ feedback from the receiving UE through the mode 1 transmission resource, if additional retransmission resources are needed to satisfy service-related requirements (e.g., latency, reliability), the transmitting UE may report NACK information to the base station through PUCCH. On the other hand, for example, when additional retransmission resources are not required, the transmitting UE may report ACK information to the base station through the PUCCH. Or, for example, the transmitting UE may not perform PUCCH transmission. For example, when the transmitting UE performs blind retransmission through mode 1 transmission resources, the transmitting UE may report NACK information to the base station through PUCCH based on the additional retransmission resources being needed. Or, for example, when the transmitting UE performs blind retransmission through the mode 1 transmission resource, the transmitting UE may report ACK information to the base station through PUCCH based on the additional retransmission resources not being needed.

Meanwhile, according to an embodiment of the present disclosure, when resource reselection is triggered at slot #N time, based on the sensing result acquired within the interval from slot #(N−offset1) to slot #(N−SEN_WIN), the transmitting UE may select a transmission resource within the selection window period from slot #(N+offset2) to slot #(N+offset3). For example, SEN_WIN may be a value greater than offset1. For example, offset3 may be a value greater than offset2. Here, for example, SEN_WIN may be the length of the sensing window. In addition, the length of the sensing window may be pre-configured from the base station/network. Also, for example, offset3 may be selected to a value less than or equal to a Packet Delay Budget (PDB) of the transmission packet. That is, for example, offset3 may be less than or equal to a Packet Delay Budget (PDB) of the transmission packet. For example, according to the procedure described above, after the transmitting UE selects a transmission resource (e.g., slot #(N+offset2+K)) within the selection window, when the transmission resource of another UE overlaps with the transmission resource before signaling for the SCI related to the transmission resource is performed, the transmitting UE may reselect the previously selected transmission resource. Such an operation may be referred to as a re-evaluation procedure. Here, for example, the sensing operation related to the re-evaluation procedure may be configured to be performed or triggered only from the above-described slot #N to the slot #(N+offset2+K−T1). Or, for example, the sensing operation related to the re-evaluation procedure may be configured to be performed or triggered only from the above-described slot #(N−offset1) to the slot #(N+offset2+K−T1). Alternatively, for example, the sensing operation related to the re-evaluation procedure may be configured to be performed or triggered only from the above-described slot #(N−SEN_WIN) to the slot #(N+offset2+K−T1). Or, for example, the sensing operation related to the re-evaluation procedure may be configured to be performed or triggered only from the above-described slot #(N+offset2) to the slot #(N+offset2+K−T1). Here, for example, T1 may be a processing time required for resource reselection based on re-evaluation sensing.

Meanwhile, according to an embodiment of the present disclosure, a resource reservation period on SCI signaled by a transmitting UE belonging to a different base station or network may be interpreted ambiguously. Therefore, for example, the size of the field related to the resource reservation period on the SCI may be defined (e.g., CEILING ($\log_2 N$)) based on the maximum number of configurable periods (e.g., N). Also, for example, ascending values of N periods may be mapped to ascending order status of bit values related to each field. For example, the transmitting UE may determine (e.g., CEILING ($\log_2 N$)) the size of the field related to the resource reservation period on the SCI based on the maximum number of configurable periods (e.g., N). Here, for example, when the above-described embodiment is applied, even if different base stations or networks configure differently the reservation period value or the number of reservation periods of resources allowed for each resource pool, the transmitting UE belonging to different base stations or networks may determine the resource reservation period on SCI without ambiguity.

Meanwhile, according to an embodiment of the present disclosure, a rule for determining a resource related to PSFCH transmission between unicast and groupcast may be configured differently. Specifically, for example, in the case of groupcast, unlike unicast, the number of members in a group (NUM_GP) may be used as a parameter for determining a PSFCH transmission resource related to a received PSSCH/PSCCH. For example, in the case of unicast, NUM_GP may be assumed to be 0. For example, in the case of unicast, NUM_GP may be 0. For convenience of description below, for example, a unicast HARQ feedback scheme is referred to as UN_HARQ, and a groupcast HARQ feedback scheme is referred to as GP_HARQ, respectively. When the above-described embodiment is applied, for example, if it is not indicated/distinguished which feedback scheme among UN_HARQ and GP_HARQ is requested on SCI related to PSSCH, ambiguity may occur in the side of the receiving UE. For example, if unicast/groupcast and/or UN_HARQ/GP_HARQ uses the same SCI format or $2^{nd}$ SCI format, if it is not indicated/distinguished which feedback scheme among UN_HARQ and GP_HARQ is requested on SCI related to PSSCH, ambiguity may occur in the side of the receiving UE. For example, if the L1 destination ID and/or the L1 source ID on the SCI related to unicast/groupcast and/or UN_HARQ/GP_HARQ are the same, if it is not indicated/distinguished which feedback scheme among UN_HARQ and GP_HARQ is requested on SCI related to PSSCH, ambiguity may occur in the side of the receiving UE. For example, in order to solve such a problem, the receiving UE may determine an applied sidelink HARQ feedback scheme according to various embodiments below.

According to an embodiment, when the receiving UE receives the SCI indicated by the L1 destination ID (e.g., LSB 16 bits of the L2 destination ID) determined in the PC5 RRC connection established by the receiving UE, the receiving UE may transmit sidelink HARQ feedback for the PSSCH related to the SCI in the UN_HARQ or GP_HARQ scheme.

According to another embodiment, when the receiving UE receives the SCI indicated by the L1 destination ID determined in the PC5 RRC connection established by the receiving UE, the receiving UE may additionally check the L1 source ID on the SCI. At this time, for example, if it matches the L1 source ID (e.g., LSB 8 bits of the L2 source ID) determined in the PC5 RRC connection established by the receiving UE, the receiving UE may transmit sidelink HARQ feedback for the PSSCH related to the SCI with the UN_HARQ or GP_HARQ scheme. For example, other than the cases described above, the receiving UE may transmit sidelink HARQ feedback for the PSSCH related to the SCI with a GP_HARQ or UN_HARQ scheme. That is, for example, when the L1 ID determined in the PC5 RRC connection and the L1 ID on the SCI do not match, the receiving UE may transmit sidelink HARQ feedback for the PSSCH related to the SCI with the GP_HARQ or UN_HARQ scheme. For example, if it matches the L1 source ID (e.g., LSB 8 bits of the L2 source ID) determined in the PC5 RRC connection established by the receiving UE, the receiving UE may transmit sidelink HARQ feedback for the PSSCH related to the SCI with UN_HARQ scheme. For example, if it does not match with the L1 source ID (eg, LSB 8 bits of the L2 source ID) determined in the PC5 RRC connection established by the receiving UE, the receiving UE may transmit sidelink HARQ feedback for the PSSCH related to the SCI with GP_HARQ scheme. For example, in the above-described rule, one of the UN_HARQ scheme or the GP_HARQ scheme may be selected according to whether the L1 ID determined or used in the PC5 RRC connection and the L1 ID on the SCI are the same.

According to another embodiment, when the receiving UE does not establish a PC5 RRC connection, the receiving UE may transmit sidelink HARQ feedback for the PSSCH related to SCI with a UN_HARQ or GP_HARQ scheme.

Meanwhile, according to an embodiment, in the case of a TX-RX distance-based sidelink HARQ feedback operation (e.g., group cast option 1), according to the following embodiment, a sidelink HARQ feedback operation without consideration of the TX-RX distance may be indicated for the UE. For example, in the case of a TX-RX distance-based sidelink HARQ feedback operation (e.g., group cast option 1), according to the following embodiment, disabling of the TX-RX distance-based sidelink HARQ feedback operation may be indicated.

According to an embodiment, when the minimum communication range field and/or the zone ID field related to the transmitting UE defined on the SCI indicates a pre-configured specific status or value, a sidelink HARQ feedback operation without consideration of the TX-RX distance may be triggered for the UE. For example, when the minimum communication range field and/or the zone ID field related to the transmitting UE defined on the SCI indicates a pre-configured specific status or value, the TX-RX distance-based sidelink HARQ feedback operation may be disabled for the UE. For example, the SCI may be the $2^{nd}$ SCI. Specifically, for example, when the minimum communication range field indicates a pre-configured value of infinity, the receiving UE receiving the SCI may transmit NACK information to the transmitting UE if PSSCH decoding fails without considering the TX-RX distance. Or, for example, even if the receiving UE fails to decode the PSSCH, the sidelink HARQ feedback (e.g., NACK) may not be transmitted to the transmitting UE. Or, for example, when the minimum communication range field indicates a pre-configured value of 0, the receiving UE receiving the SCI may transmit NACK information to the transmitting UE if PSSCH decoding fails without considering the TX-RX distance. Or, for example, even if the receiving UE fails to decode the PSSCH, the sidelink HARQ feedback (e.g., NACK) may not be transmitted to the transmitting UE.

Meanwhile, according to an embodiment of the present disclosure, when scheduling sidelink transmission between different RATs, the following various embodiments may be applied. Here, different RATs may be LTE and NR.

According to an embodiment, when an LTE base station (e.g., eNB) schedules an NR sidelink (e.g., schedules a sidelink transmission resource based on CG type 1), if the NR sidelink is performed on an NR licensed carrier, the first transmission timing of the NR sidelink may be determined based on the TA/2 (e.g., TA refers to timing advance) value between the NR base station (e.g., gNB) and the UE. For example, the first transmission timing of the NR sidelink may be determined based on $$T_{DCI} - \frac{N_{TA}}{2} + X + 4 \times 10^{-3} \text{ or}$$

$$T_{DCI} - \frac{N_{TA}}{2} + X + (4+M) \times 10^{-3}.$$

Also, for example, if the NR sidelink is performed on an ITS dedicated carrier, the first transmission timing of the NR sidelink may be determined based on the TA/2 value between the LTE base station and the UE. Here, for example, the TA value may be 0 or a pre-configured value. Here, for example, the $T_{DCI}$ may be a start time of a slot in which a cross-RAT scheduling DCI is received. For example, the X value may be a timing offset value indicated on the cross-RAT scheduling DCI. For example, the M value may be a timing offset value on DCI used when the LTE base station schedules mode 3 sidelink transmission to the UE.

According to an embodiment, when an NR base station (e.g., gNB) schedules an LTE sidelink (e.g., schedules a transmission resource based on a mode 3 SL SPS), if the LTE sidelink is performed on an LTE licensed carrier, the first transmission timing of the LTE sidelink may be determined based on a TA/2 value between the LTE base station (e.g., eNB) and the UE. For example, the first transmission timing may be determined based on $$T_{DCI} - \frac{N_{TA}}{2} \times T_S + X + (4+M) \times 10^{-3}.$$

Also, for example, if the LTE sidelink is performed on an ITS dedicated carrier, the first transmission timing of the NR sidelink may be determined based on the TA/2 value between the NR base station (e.g., gNB) and the UE. Here, for example, the TA value may be 0 or a pre-configured value. Here, for example, the $T_S$ value may be 1/30720. For example, the $N_{TA}$ value may be a timing offset between uplink and/or downlink radio frames.

Figure 13:
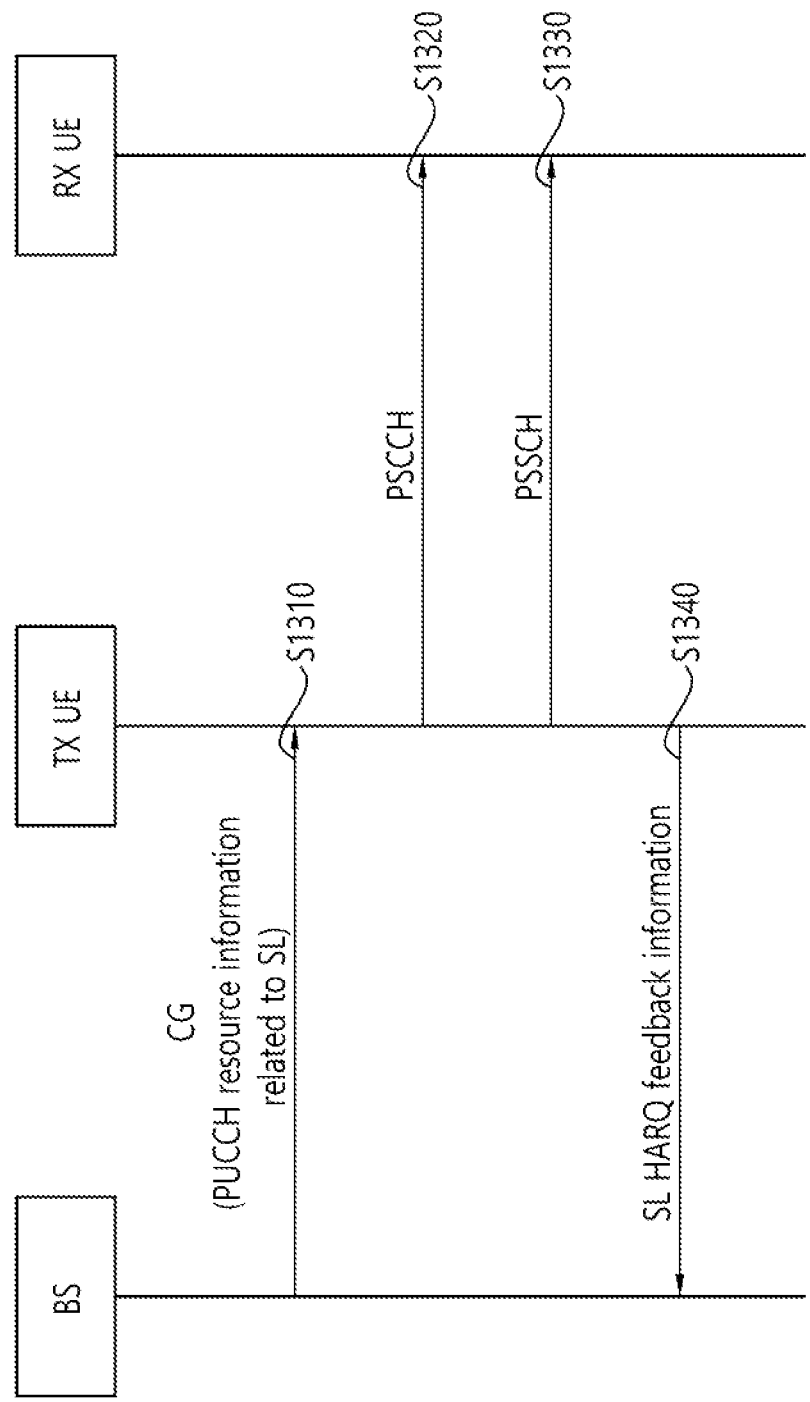
FIG. 13 shows a procedure in which a transmitting UE transmits sidelink HARQ feedback to a base station through a PUCCH, based on an embodiment of the present disclosure.

FIG. 13 shows a procedure in which a transmitting UE transmits sidelink HARQ feedback to a base station through a PUCCH, based on an embodiment of the present disclosure. The embodiment of FIG. 13 may be combined with various embodiments of the present disclosure.

Referring to FIG. 13, in step S1310, the transmitting UE may receive a CG from the base station. For example, the CG may include information on the PUCCH resource related to sidelink. In step S1320, the transmitting UE may transmit a PSCCH to the receiving UE based on the CG. In step S1330, the transmitting UE may transmit a PSSCH related to the PSCCH to the receiving UE based on the CG. For example, a SCI may be transmitted through the PSCCH or the PSSCH related to the PSSCH. For example, the transmitting UE may transmit the SCI to the receiving UE through the PSCCH or the PSSCH related to the PSCCH. For example, the SCI may include period information of reserved resource(s) related to sidelink. For example, the period information of the reserved resource(s) related to the sidelink may be configured by a pre-configured bit value. For example, candidate period value(s) available in a resource pool among a plurality of candidate period values may be configured for the transmitting UE. For example, a mapping relationship between candidate period value(s) configured for the transmitting UE and pre-configured bit value(s) may be determined. For example, the candidate period value(s) configured for the transmitting UE may be determined to be less than or equal to the maximum number of candidate periods based on the pre-configured bit value(s). For example, the candidate period value(s) configured for the transmitting UE may be mapped to the pre-configured bit(s) in ascending order of the decimal value of the pre-configured bits, starting with the first candidate period value.

In step S1340, the transmitting UE may transmit sidelink HARQ feedback information to the base station through the PUCCH. For example, based on sidelink HARQ feedback being disabled and retransmission related to the PSSCH not being required, the transmitting UE may transmit sidelink HARQ feedback information to the base station through the PUCCH resource. For example, the sidelink HARQ feedback information may include ACK information or NACK information. For example, the transmitting UE may transmit ACK to the base station through the PUCCH resource, based on sidelink HARQ feedback being disabled and retransmission related to the PSSCH not being required.

Figure 14:
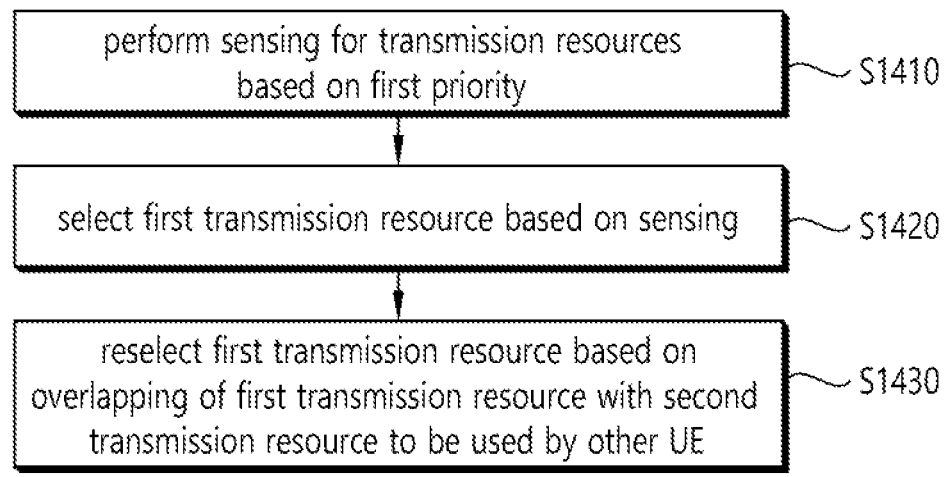
FIG. 14 shows a method for a transmitting UE to reselect a first transmission resource, based on an embodiment of the present disclosure.
Figure 15:
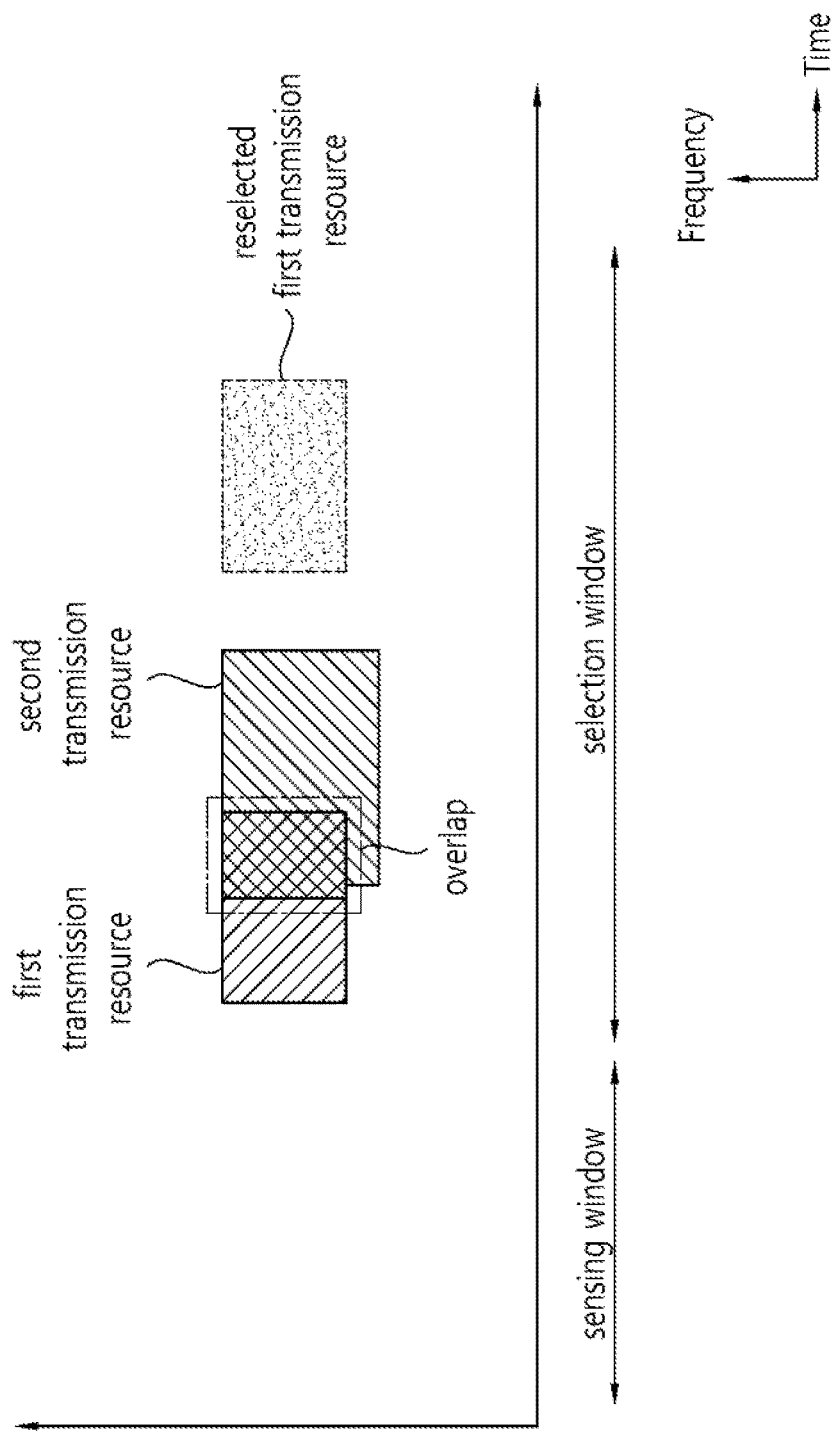
FIG. 15 shows an example in which a transmitting UE reselects a first transmission resource based on overlapping of the first transmission resource with a second transmission resource to be used by other UE, based on an embodiment of the present disclosure.

FIG. 14 shows a method for a transmitting UE to reselect a first transmission resource, based on an embodiment of the present disclosure. FIG. 15 shows an example in which a transmitting UE reselects a first transmission resource based on overlapping of the first transmission resource with a second transmission resource to be used by other UE, based on an embodiment of the present disclosure. The embodiment of FIG. 14 and FIG. 15 may be combined with various embodiments of the present disclosure.

Referring to FIG. 14, in step S1410, the transmitting UE may perform sensing for transmission resources based on a first priority. In step S1420, the transmitting UE may select the first transmission resource based on the sensing. For example, the SCI may include information for sharing the first transmission resource with other UE. For example, the transmitting UE may transmit the SCI to other UE through a PSCCH or a PSSCH related to the PSCCH.

In step S1430, the transmitting UE may reselect the first transmission resource based on the overlapping of the first transmission resource with the second transmission resource to be used by other UE. For example, a priority of a packet related to the second transmission resource may be higher than a pre-configured priority. For example, based on a packet related to the first transmission resource not being transmitted, the transmitting UE may compare the priority of the packet related to the second transmission resource with the first priority. Herein, for example, based on the priority of the packet related to the second transmission resource being higher than the first priority, the transmitting UE may reselect the first transmission resource.

Specifically, referring to FIG. 15, the transmitting UE may perform sensing for transmission resources based on the first priority within a sensing window related to the transmission resources, and may select the first transmission resource within the selection window based on the sensing. In this case, for example, based on information related to a transmission resource received from other UE through a SCI, the transmitting UE may determine that the first transmission resource and the second transmission resource are overlapped. For example, if the priority of the packet related to the second transmission resource overlapping the first transmission resource is higher than the pre-configured priority, the transmitting UE may reselect the first transmission resource.

Figure 16:
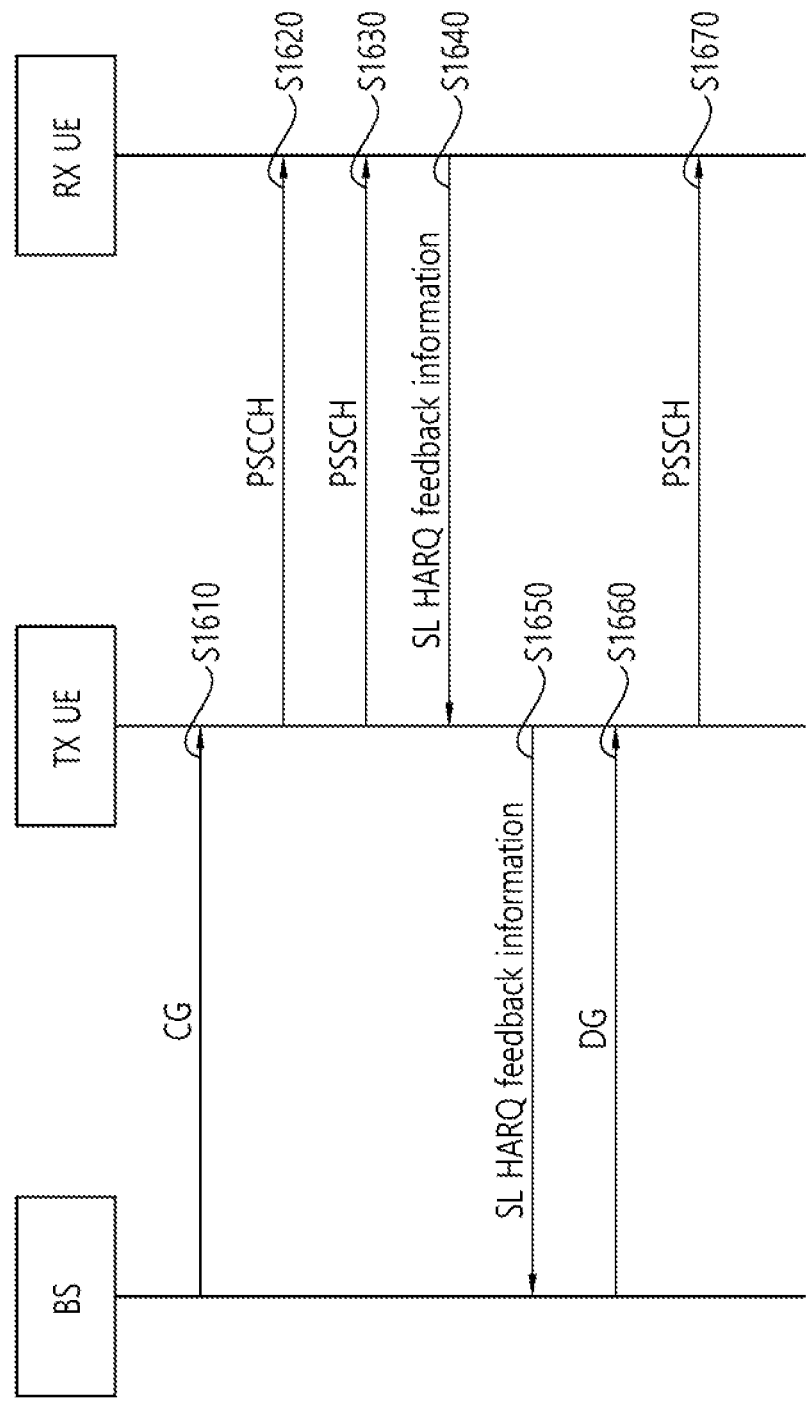
FIG. 16 shows a procedure in which a transmitting UE transmits sidelink HARQ feedback to a base station through a PUCCH and receives a DG from the base station, based on an embodiment of the present disclosure.
Figure 17:
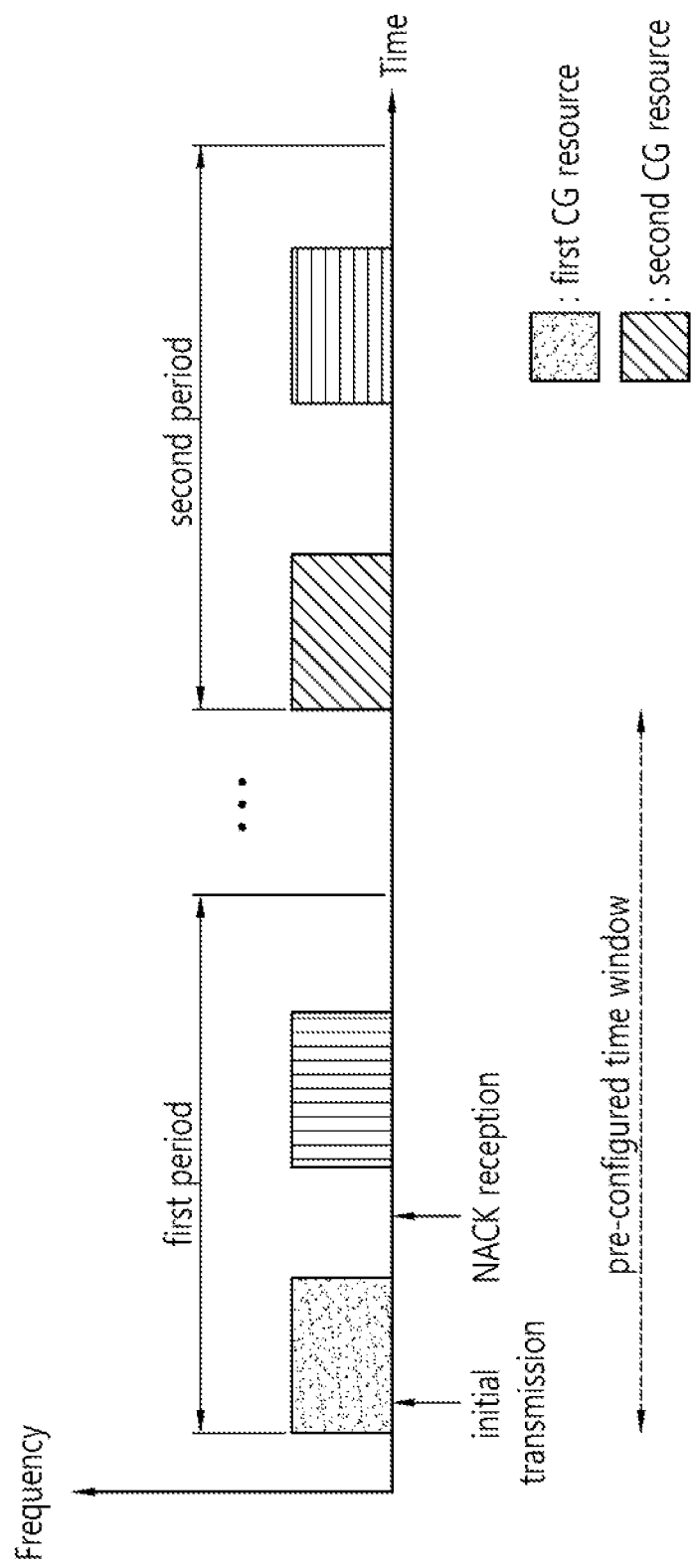
FIG. 17 shows an example in which a transmitting UE performs retransmission through a resource allocated through a CG within a pre-configured time window, based on an embodiment of the present disclosure.

FIG. 16 shows a procedure in which a transmitting UE transmits sidelink HARQ feedback to a base station through a PUCCH and receives a DG from the base station, based on an embodiment of the present disclosure. FIG. 17 shows an example in which a transmitting UE performs retransmission through a resource allocated through a CG within a pre-configured time window, based on an embodiment of the present disclosure. The embodiment of FIG. 16 and FIG. 17 may be combined with various embodiments of the present disclosure.

Referring to FIG. 16, in step S1610, the transmitting UE may receive a CG from the base station. For example, the CG may include at least one of information on the PUCCH resource related to sidelink or period information of resources related to the CG. In step S1620, the transmitting UE may transmit a PSCCH to the receiving UE within a first period based on the CG. For example, the first period may be determined based on the period information of the resources related to the CG. In step S1630, the transmitting UE may transmit a PSSCH related to the PSCCH to the receiving UE within the first period based on the CG.

In step S1640, the transmitting UE may receive sidelink HARQ feedback information from the receiving UE. For example, the transmitting UE may receive sidelink HARQ feedback for the PSSCH from the receiving UE based on sidelink HARQ feedback being enabled. For example, the sidelink HARQ feedback information may include ACK information or NACK information. For example, the transmitting UE may receive NACK for the PSSCH from the receiving UE based on sidelink HARQ feedback being enabled.

In step S1650, the transmitting UE may transmit sidelink HARQ feedback information to the base station through the PUCCH. For example, the transmitting UE may transmit NACK information for the PSSCH to the base station through the PUCCH. In step S1660, the transmitting UE may receive a DG from the base station. For example, the base station may transmit the DG to the UE based on NACK information.

In step S1670, the transmitting UE may retransmit a PSSCH to the receiving UE based on the DG. For example, the transmitting UE may retransmit a PSCCH or a PSSCH related to the PSCCH to the receiving UE within a pre-configured time window through a resource allocated by the DG. For example, the transmitting UE may retransmit the PSCCH or the PSSCH related to the PSCCH to the receiving UE based on the resource allocated through the DG within the pre-configured time window related to the CG. For example, the pre-configured time window may include a period located after the first period and before a period including transmission resource(s) having the same HARQ process ID as a HARQ process ID related to resource(s) of the first period in which the initial transmission is performed For example, the transmitting UE may receive, from the receiving UE, sidelink HARQ feedback for the PSCCH or the PSSCH related to the PSCCH retransmitted based on the DG (hereinafter, first DG). For example, based on the sidelink HARQ feedback for the retransmitted PSCCH or the retransmitted PSSCH related to the PSCCH being NACK, the transmitting UE may transmit NACK to the base station through a PUCCH related to the first DG. For example, the transmitting UE may receive a second DG from the base station, and the transmitting UE may retransmit a PSCCH or a PSSCH related to the PSCCH to the receiving UE based on a resource allocated through the second DG within a pre-configured window related to the CG.

Specifically, referring to FIG. 17, for example, the transmitting UE may perform initial transmission through the first CG resource within the first period. Then, for example, the transmitting UE may receive NACK for the initial transmission from the receiving UE. For example, the transmitting UE may perform retransmission within a pre-configured time window based on the reception of the NACK. For example, the pre-configured window may be a pre-configured window related to the CG. For example, the transmitting UE may perform retransmission before a period in which the second CG resource having the same HARQ process ID as the first CG resource appears. That is, for example, the pre-configured time window may include a period before a period in which the second CG resource having the same HARQ process ID as the first CG resource appears.

For example, a buffer related to a sidelink HARQ process may be flushed by the transmitting UE after the pre-configured time window. For example, the transmitting UE may flush the buffer for the sidelink HARQ process related to the PSSCH after the pre-configured time window. For example, the sidelink HARQ process may be a HARQ process based on the PSCCH or the PSSCH related to the PSCCH.

Figure 18:
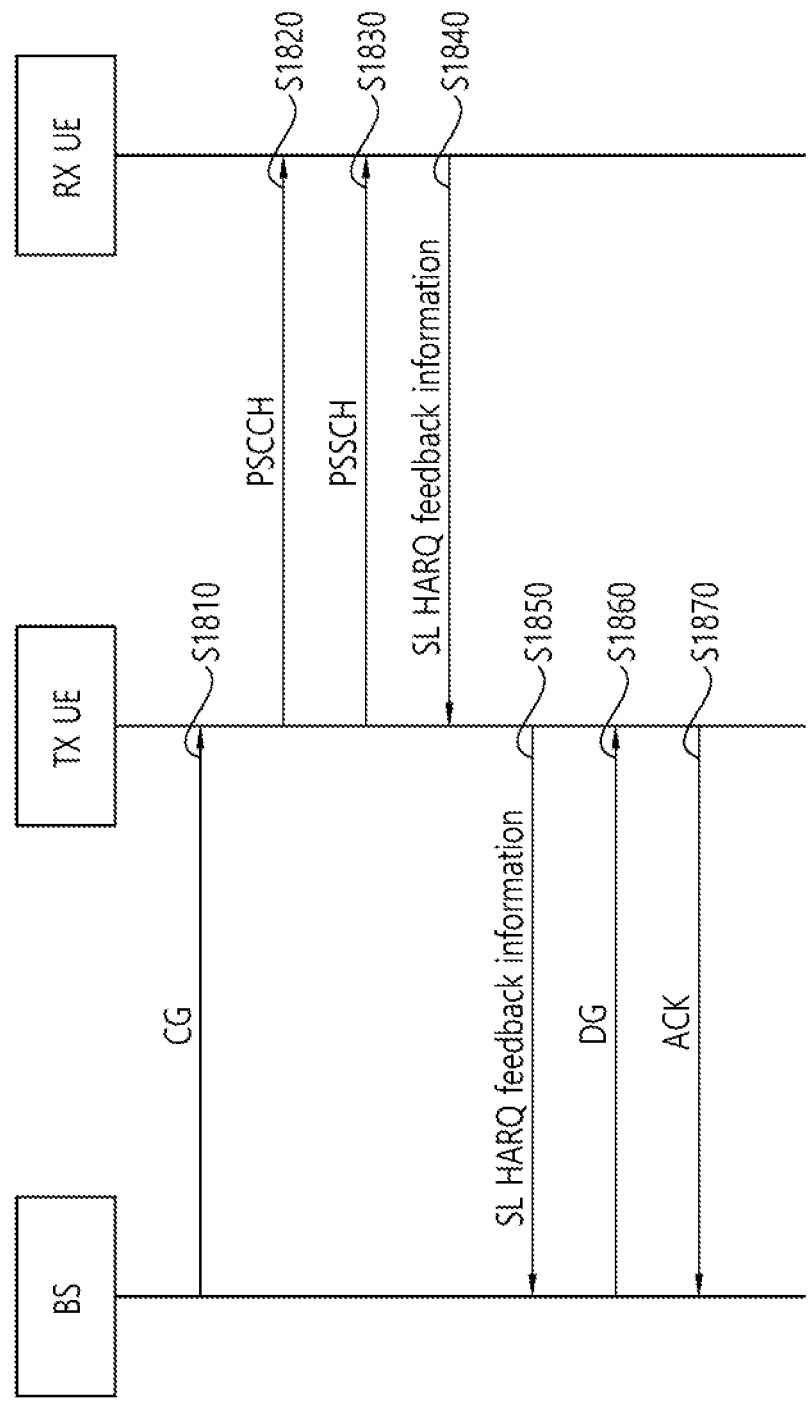
FIG. 18 shows a procedure for transmitting ACK to a base station based on a DG which is received by a transmitting UE, based on an embodiment of the present disclosure.

FIG. 18 shows a procedure for transmitting ACK to a base station based on a DG which is received by a transmitting UE, based on an embodiment of the present disclosure. The embodiment of FIG. 18 may be combined with various embodiments of the present disclosure.

Referring to FIG. 18, in step S1810, the transmitting UE may receive a CG from the base station. For example, the CG may include at least one of information on a PUCCH resource related to sidelink or period information of resources related to the CG. In step S1820, the transmitting UE may transmit a PSCCH to the receiving UE based on the CG. In step S1830, the transmitting UE may transmit a PSSCH related to the PSCCH to the receiving UE based on the CG. In step S1840, the transmitting UE may receive sidelink HARQ feedback information from the receiving UE. For example, the transmitting UE may receive sidelink HARQ feedback for the PSSCH from the receiving UE based on sidelink HARQ feedback being enabled. For example, the sidelink HARQ feedback information may include ACK information or NACK information. For example, the transmitting UE may receive ACK for the PSSCH from the receiving UE based on sidelink HARQ feedback being enabled.

In step S1850, the transmitting UE may transmit sidelink HARQ feedback information to the base station through the PUCCH. For example, the transmitting UE may transmit ACK information for the PSSCH to the base station through the PUCCH. In step S1860, the transmitting UE may receive a DG from the base station. For example, the base station may transmit the DG to the transmitting UE based on misidentification of ACK information as NACK information. For example, the transmitting UE may not transmit a PSCCH or a PSSCH related to the PSCCH to the receiving UE based on a resource allocated through the DG. In step S1870, the transmitting UE may transmit ACK information to the base station through a PUCCH based on the reception of the DG.

For example, based on sidelink HARQ feedback being enabled, and based on the transmitting UE which receives ACK from the receiving UE, and based on the transmitting UE which transmits ACK to the base station through the PUCCH, the transmitting UE may receive a DG and PUCCH information related to the DG from the base station. Thereafter, for example, the transmitting UE may not retransmit a PSCCH or a PSSCH related to the PSCCH to the receiving UE based on a resource allocated through the DG. Also, for example, the transmitting UE may transmit ACK to the base station based on the PUCCH resource allocated through the DG.

Based on an embodiment of the present disclosure, the transmitting UE may be allocated a resource related to initial transmission from the base station through a DG. In this case, for example, the transmitting UE may receive a first DG and PUCCH information related to the first DG from the base station. Herein, for example, the first DG may be a DG for allocating the resource related to initial transmission to the transmitting UE. For example, the transmitting UE may transmit a PSCCH to the receiving UE based on the first DG. For example, the transmitting UE may transmit a PSSCH related to the PSCCH to the receiving UE based on the first DG. For example, the transmitting UE may receive sidelink HARQ feedback information from the receiving UE. For example, the transmitting UE may receive sidelink HARQ feedback for the PSSCH from the receiving UE based on sidelink HARQ feedback being enabled. For example, the sidelink HARQ feedback information may include ACK information or NACK information. For example, the transmitting UE may receive ACK for the PSSCH from the receiving UE based on sidelink HARQ feedback being enabled. For example, the transmitting UE may transmit ACK information for the PSSCH to the base station through the PUCCH. For example, the transmitting UE may receive a second DG from the base station. Herein, for example, the second DG may be a DG for allocating a resource related to retransmission to the transmitting UE. For example, the base station may transmit the second DG to the transmitting UE based on the misidentification of ACK information as NACK information. For example, the transmitting UE may not transmit a PSCCH or a PSSCH related to the PSCCH to the receiving UE based on the resource allocated through the second DG. The transmitting UE may transmit ACK information to the base station through a PUCCH based on the reception of the second DG.

Figure 19:
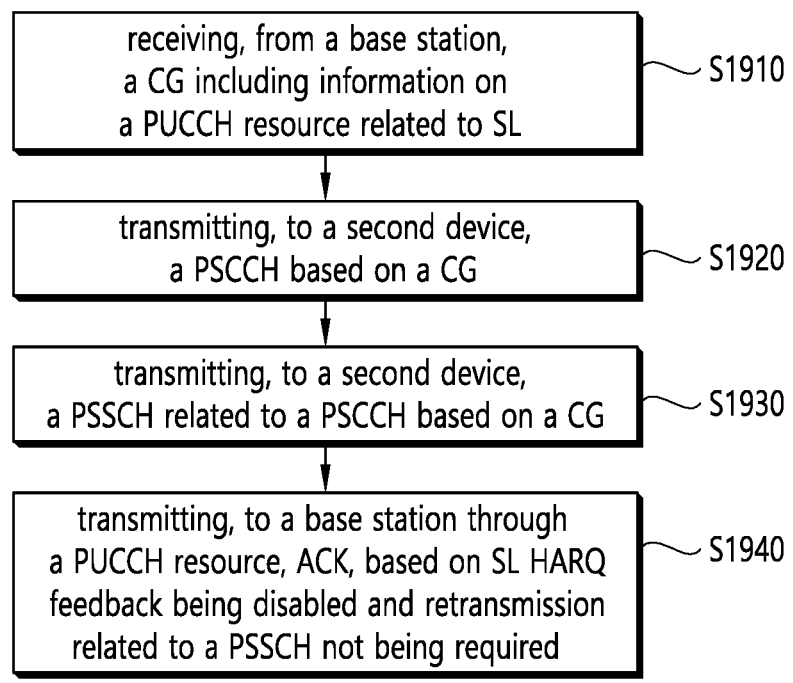
FIG. 19 shows a method in which a first device transmits sidelink HARQ feedback to a base station through a PUCCH, based on an embodiment of the present disclosure.

FIG. 19 shows a method in which a first device transmits sidelink HARQ feedback to a base station through a PUCCH, based on an embodiment of the present disclosure. The embodiment of FIG. 19 may be combined with various embodiments of the present disclosure.

Referring to FIG. 19, in step S1910, the first device 100 may receive, from a base station, a configured grant (CG). For example, the CG may include information on a physical uplink control channel (PUCCH) resource related to sidelink (SL). For example, the CG may include period information of a resource related to the CG.

In step S1920, the first device 100 may transmit, to the second device 200, a physical sidelink control channel (PSCCH) based on the CG. In step S1930, the first device 100 may transmit, to the second device 200, a physical sidelink shared channel (PSSCH) related to the PSCCH based on the CG. For example, the first device 100 may transmit the PSCCH or the PSSCH related to the PSCCH through a CG resource in a first period. For example, the first period may be determined based on the period information of the resource related to the CG.

In step S1940, the first device 100 may transmit, to the base station through the PUCCH resource, acknowledgment (ACK), based on SL hybrid automatic repeat request (HARQ) feedback being disabled and retransmission related to the PSSCH not being required.

For example, the first device 100 may receive, from the second device, first SL HARQ feedback information for the PSSCH based on SL HARQ feedback being enabled. For example, the first device 100 may transmit, to the base station through a PUCCH, the first SL HARQ feedback information. For example, the first device 100 may receive, from the base station, a first dynamic grant (DG) and PUCCH information related to the first DG, based on the first SL HARQ feedback information which is a negative acknowledgment (NACK). For example, the first device 100 may retransmit, to the second device 200, the PSCCH or the PSSCH related to the PSCCH based on a resource allocated through the first DG within a pre-configured time window related to the CG.

For example, the first device 100 may receive, from the second device 200, second SL HARQ feedback information for the retransmitted PSCCH or the retransmitted PSSCH related to the retransmitted PSCCH. For example, the first device 100 may transmit, to the base station through a PUCCH related to the first DG, NACK based on the second SL HARQ feedback information which is NACK. For example, the first device 100 may receive, from the base station, a second DG and PUCCH information related to the second DG. For example, the first device 100 may retransmit, to the second device 200, the PSCCH or the PSSCH related to the PSCCH based on a resource allocated through the second DG within the pre-configured time window related to the CG.

For example, a buffer related to a SL HARQ process may be flushed by the first device 100 after the pre-configured time window related to the CG. For example, the SL HARQ process is a HARQ process based on the retransmitted PSCCH or the retransmitted PSSCH related to the retransmitted PSCCH.

For example, the first device 100 may receive, from the base station, a DG and PUCCH information related to the DG, based on SL HARQ feedback being enabled, the first device 100 which receives ACK from the second device 200, and the first device 100 which transmits ACK to the base station through a PUCCH. For example, the base station may misidentify ACK information transmitted by the first device 100 through the PUCCH as NACK information. For example, the base station may transmit the DG to the first device 100 based on the misidentification of ACK information as NACK information. For example, the first device 100 may not retransmit the PSCCH or the PSSCH related to the PSCCH to the second device 200 based on a resource allocated through the DG. For example, the first device 100 may transmit ACK to the base station based on a PUCCH resource allocated through the DG.

The proposed method may be applied to the device(s) based on various embodiments of the present disclosure.

First, the processor 102 of the first device 100 may control the transceiver 106 to receive, from a base station, a configured grant (CG). In addition, the processor 102 of the first device 100 may control the transceiver 106 to transmit, to the second device 200, a physical sidelink control channel (PSCCH) based on the CG. In addition, the processor 102 of the first device 100 may control the transceiver 106 to transmit, to the second device 200, a physical sidelink shared channel (PSSCH) related to the PSCCH based on the CG. In addition, the processor 102 of the first device 100 may control the transceiver 106 to transmit, to the base station through the PUCCH resource, acknowledgment (ACK), based on SL hybrid automatic repeat request (HARQ) feedback being disabled and retransmission related to the PSSCH not being required.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, a configured grant (CG) including information on a physical uplink control channel (PUCCH) resource related to sidelink (SL); transmit, to a second device, a physical sidelink control channel (PSCCH) based on the CG; transmit, to the second device, a physical sidelink shared channel (PSSCH) related to the PSCCH based on the CG; and transmit, to the base station through the PUCCH resource, acknowledgment (ACK), based on SL hybrid automatic repeat request (HARQ) feedback being disabled and retransmission related to the PSSCH not being required.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a base station, a configured grant (CG) including information on a physical uplink control channel (PUCCH) resource related to sidelink (SL); transmit, to a second UE, a physical sidelink control channel (PSCCH) based on the CG; transmit, to the second UE, a physical sidelink shared channel (PSSCH) related to the PSCCH based on the CG; and transmit, to the base station through the PUCCH resource, acknowledgment (ACK), based on SL hybrid automatic repeat request (HARQ) feedback being disabled and retransmission related to the PSSCH not being required.

Based on an embodiment of the present disclosure, a non-transitory computer-readable storage medium storing instructions may be provided. For example, the instructions, when executed, may cause a first device to: receive, from a base station, a configured grant (CG) including information on a physical uplink control channel (PUCCH) resource related to sidelink (SL); transmit, to a second device, a physical sidelink control channel (PSCCH) based on the CG; transmit, to the second device, a physical sidelink shared channel (PSSCH) related to the PSCCH based on the CG; and transmit, to the base station through the PUCCH resource, acknowledgment (ACK), based on SL hybrid automatic repeat request (HARQ) feedback being disabled and retransmission related to the PSSCH not being required.

Figure 20:
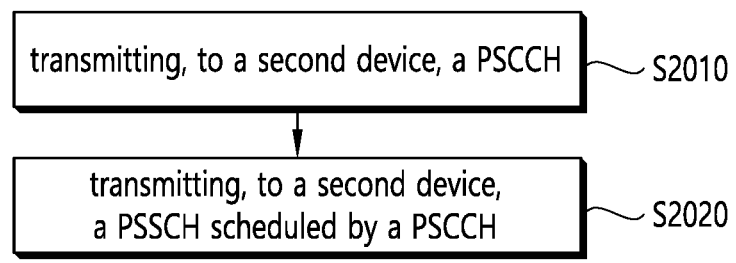
FIG. 20 shows a method in which a first device transmits a SCI to a second device through a PSCCH or a PSSCH related to the PSCCH, based on an embodiment of the present disclosure.

FIG. 20 shows a method in which a first device transmits a SCI to a second device through a PSCCH or a PSSCH related to the PSCCH, based on an embodiment of the present disclosure. The embodiment of FIG. 20 may be combined with various embodiments of the present disclosure.

Referring to FIG. 20, in step S2010, the first device 100 may transmit, to the second device 200, a physical sidelink control channel (PSCCH). In step S2020, the first device 100 may transmit, to the second device 200, a physical sidelink shared channel (PSSCH) related to the PSCCH. For example, the first device 100 may transmit a SCI through the PSCCH or the PSSCH related to the PSCCH. For example, the SCI may include period information of a reserved resource related to sidelink (SL). For example, the period information of the reserved resource related to the SL may be configured by a pre-configured bit value. For example, at least one candidate period value available in a resource pool among a plurality of candidate period values is configured for the first device. For example, a mapping relationship between the at least one candidate period value configured for the first device and the pre-configured bit value may be determined. For example, a number of the at least one candidate period value configured for the first device may be determined to be less than or equal to a maximum number of candidate periods based on the pre-configured bit value. For example, the at least one candidate period value configured for the first device may be mapped to the pre-configured bit value in ascending order of a decimal value of the pre-configured bit value from 1st candidate period value.

For example, the first device 100 may sense transmission resources based on a first priority. For example, the first device 100 may select a first transmission resource based on the sensing. For example, the first device 100 may reselect the first transmission resource based on the first transmission resource being overlapped with a second transmission resource to be used by the second device 200. For example, the SCI may include information for sharing the first transmission resource with other devices. For example, the second transmission resource may be a resource to be used by the second device 200 and may be a resource overlapping the first transmission resource. For example, a priority of a packet related to the second transmission resource may be higher than a pre-configured priority. For example, the first device 100 may compare the priority of the packet related to the second transmission resource with the first priority, based on a packet related to the first transmission resource not being transmitted. For example, based on the priority of the packet related to the second transmission resource being higher than the first priority, the first device 100 may reselect the first transmission resource. For example, if the packet related to the first transmission resource is not transmitted, the first device 100 may reselect the first transmission resource, based on the priority of the packet related to the second transmission resource being higher than the pre-configured priority and the first priority.

The proposed method may be applied to the device(s) based on various embodiments of the present disclosure. First, the processor 102 of the first device 100 may control the transceiver 106 to transmit, to the second device 200, a physical sidelink control channel (PSCCH). In addition, the processor 102 of the first device 100 may control the transceiver 106 to transmit, to the second device 200, a physical sidelink shared channel (PSSCH) related to the PSCCH.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device, a physical sidelink control channel (PSCCH); and transmit, to the second device, a physical sidelink shared channel (PSSCH) related to the PSCCH. For example, a SCI may be transmitted through the PSCCH or the PSSCH related to the PSCCH. For example, the SCI may include period information of a reserved resource related to sidelink (SL). For example, the period information of the reserved resource related to the SL may be configured by a pre-configured bit value. For example, at least one candidate period value available in a resource pool among a plurality of candidate period values may be configured for the first device. For example, a mapping relationship between the at least one candidate period value configured for the first device and the pre-configured bit value may be determined.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device, a physical sidelink control channel (PSCCH); and transmit, to the second device, a physical sidelink shared channel (PSSCH) related to the PSCCH. For example, a SCI may be transmitted through the PSCCH or the PSSCH related to the PSCCH. For example, the SCI may include period information of a reserved resource related to sidelink (SL). For example, the period information of the reserved resource related to the SL may be configured by a pre-configured bit value. For example, at least one candidate period value available in a resource pool among a plurality of candidate period values may be configured for the first device. For example, a mapping relationship between the at least one candidate period value configured for the first device and the pre-configured bit value may be determined.

Based on an embodiment of the present disclosure, the base station may transmit, to a first device, a configured grant (CG) including information on a physical uplink control channel (PUCCH) resource related to sidelink (SL). For example, a physical sidelink control channel (PSCCH) may be transmitted from the first device to a second device based on the CG. For example, a physical sidelink shared channel (PSSCH) related to the PSCCH may be transmitted from the first device to the second device based on the CG. For example, the base station may receive, from the first device through the PUCCH resource, acknowledgment (ACK), based on SL hybrid automatic repeat request (HARQ) feedback being disabled and retransmission related to the PSSCH not being required.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, a configured grant (CG) including information on a physical uplink control channel (PUCCH) resource related to sidelink (SL), wherein a physical sidelink control channel (PSCCH) is transmitted from the first device to a second device based on the CG, wherein a physical sidelink shared channel (PSSCH) related to the PSCCH is transmitted from the first device to the second device based on the CG; and receive, from the first device through the PUCCH resource, acknowledgment (ACK), based on SL hybrid automatic repeat request (HARQ) feedback being disabled and retransmission related to the PSSCH not being required.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
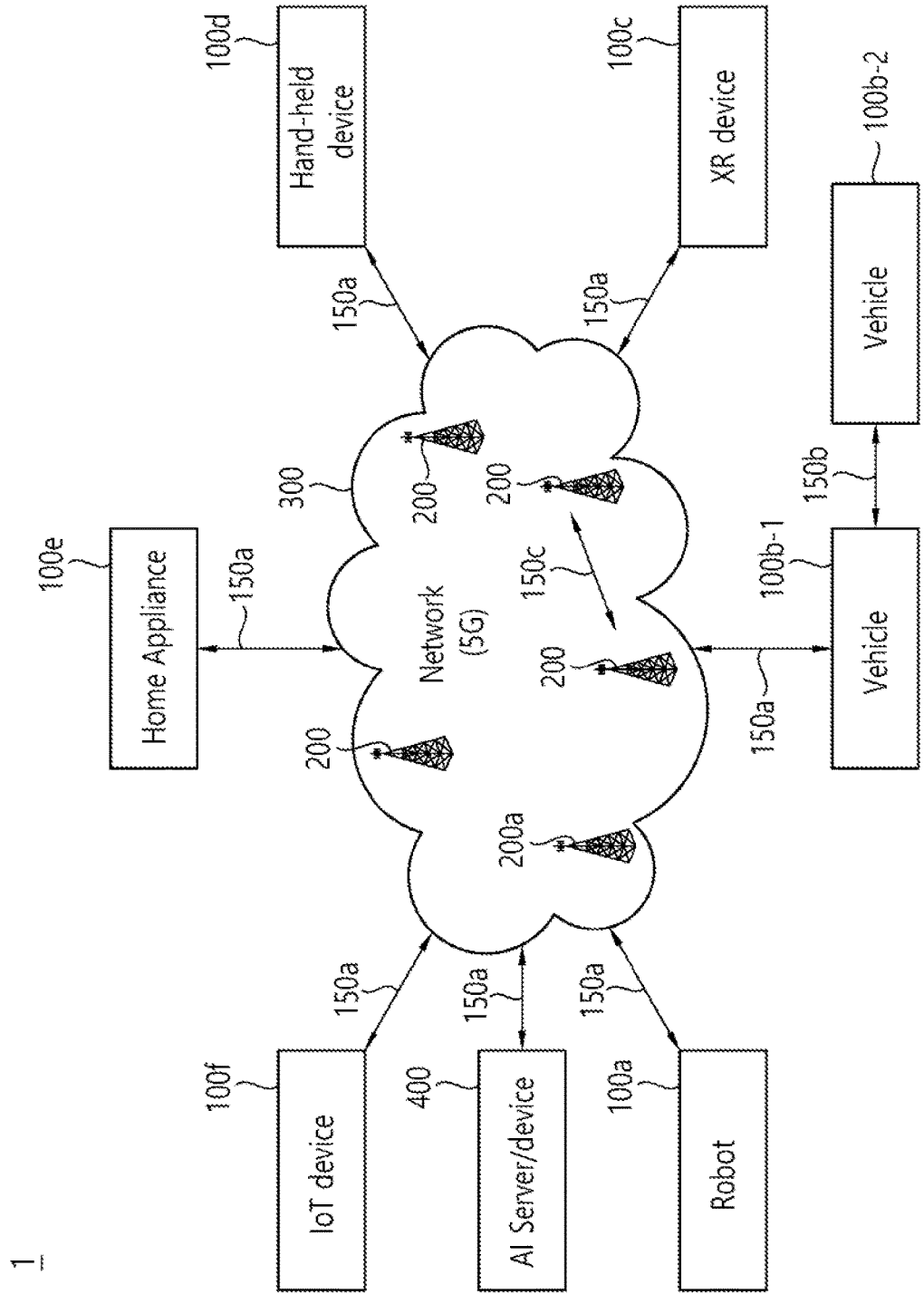
FIG. 21 shows a communication system 1, based on an embodiment of the present disclosure.

FIG. 21 shows a communication system 1, based on an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
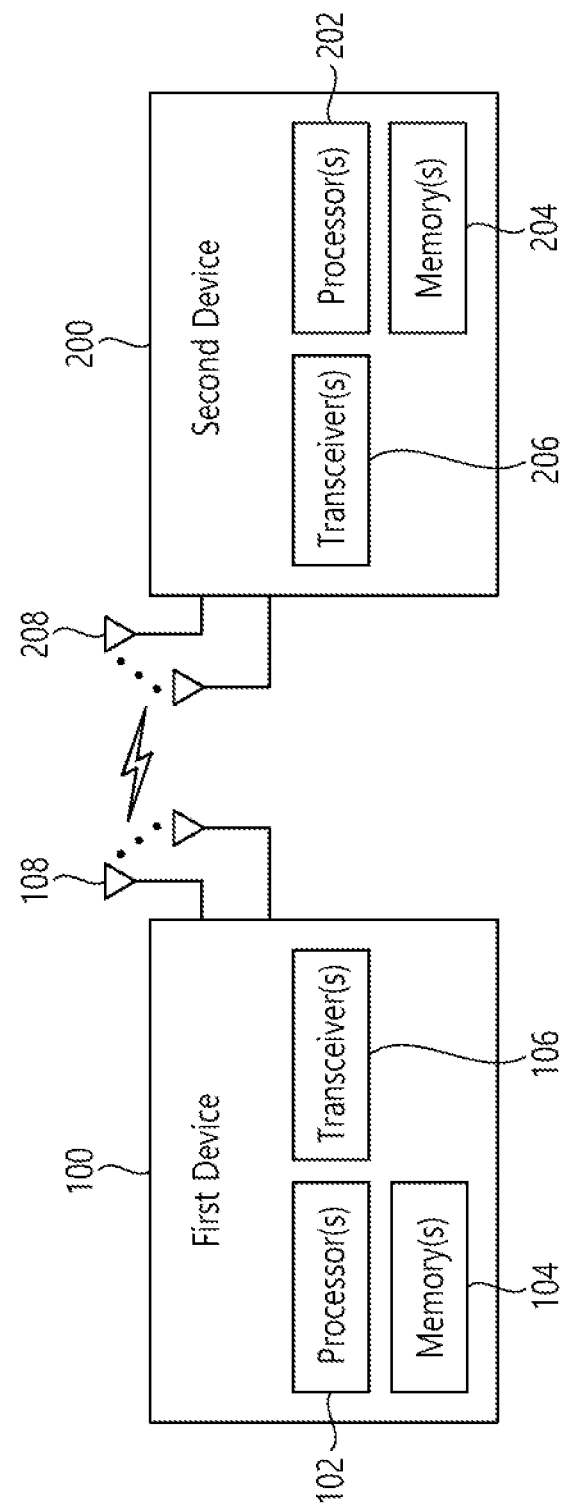
FIG. 22 shows wireless devices, based on an embodiment of the present disclosure.

FIG. 22 shows wireless devices, based on an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
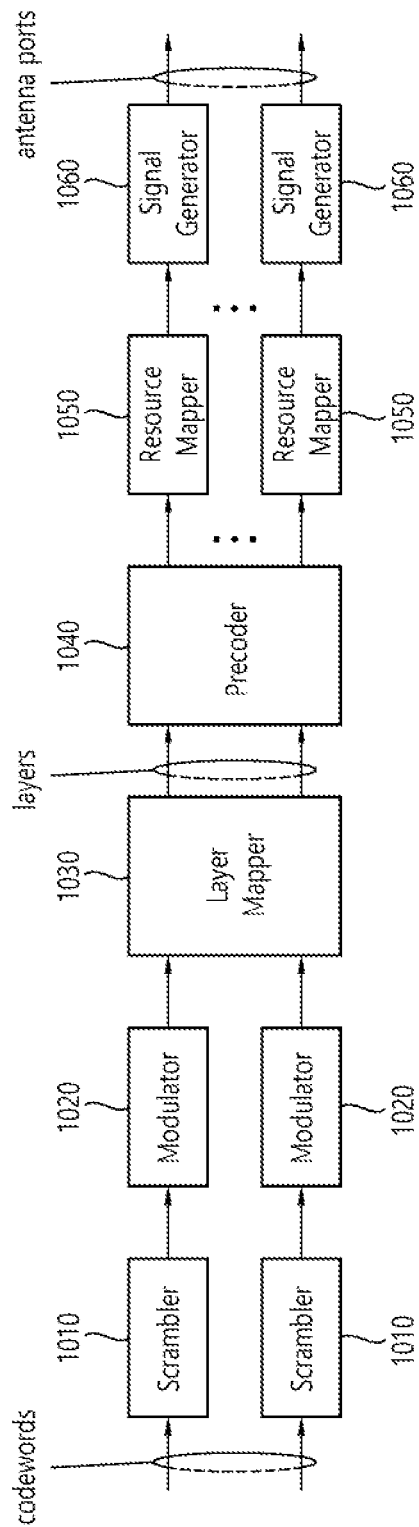
FIG. 23 shows a signal process circuit for a transmission signal, based on an embodiment of the present disclosure.

FIG. 23 shows a signal process circuit for a transmission signal, based on an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
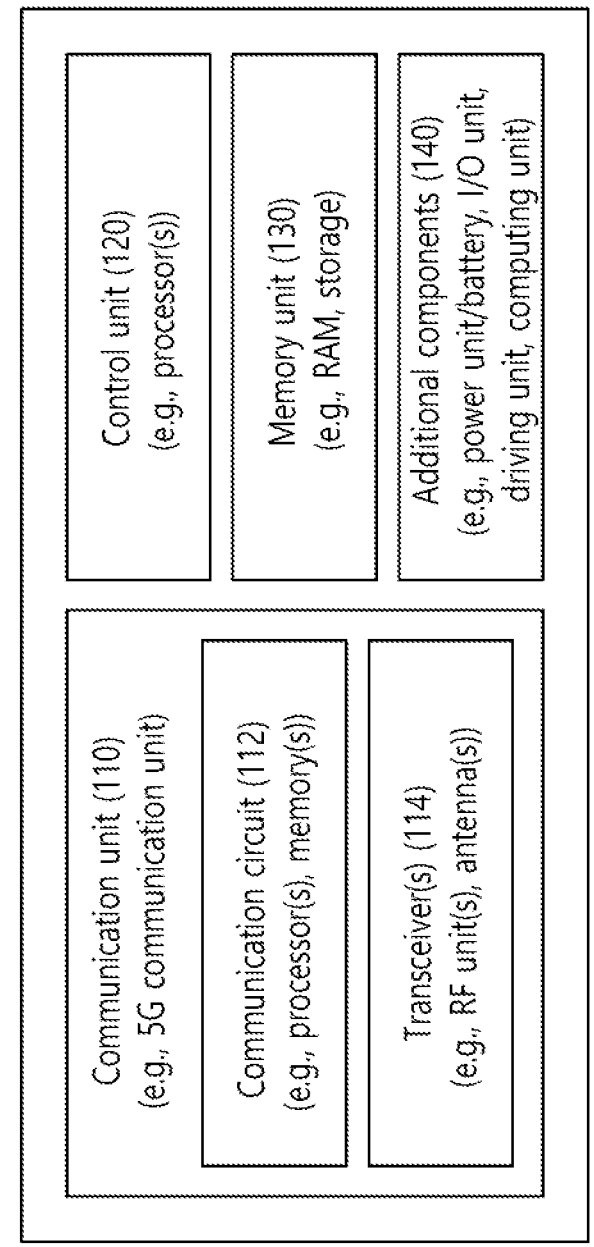
FIG. 24 shows another example of a wireless device, based on an embodiment of the present disclosure.

FIG. 24 shows another example of a wireless device, based on an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
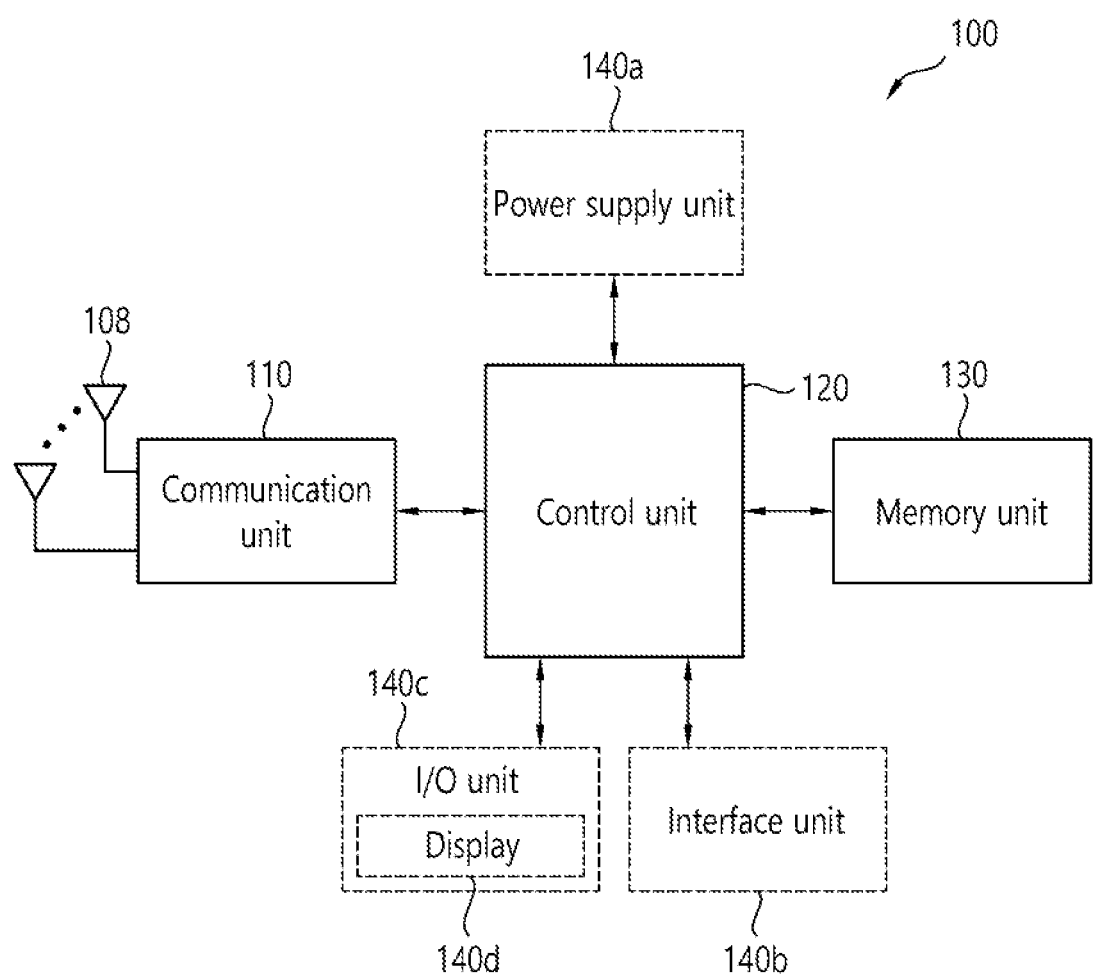
FIG. 25 shows a hand-held device, based on an embodiment of the present disclosure.

FIG. 25 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 26:
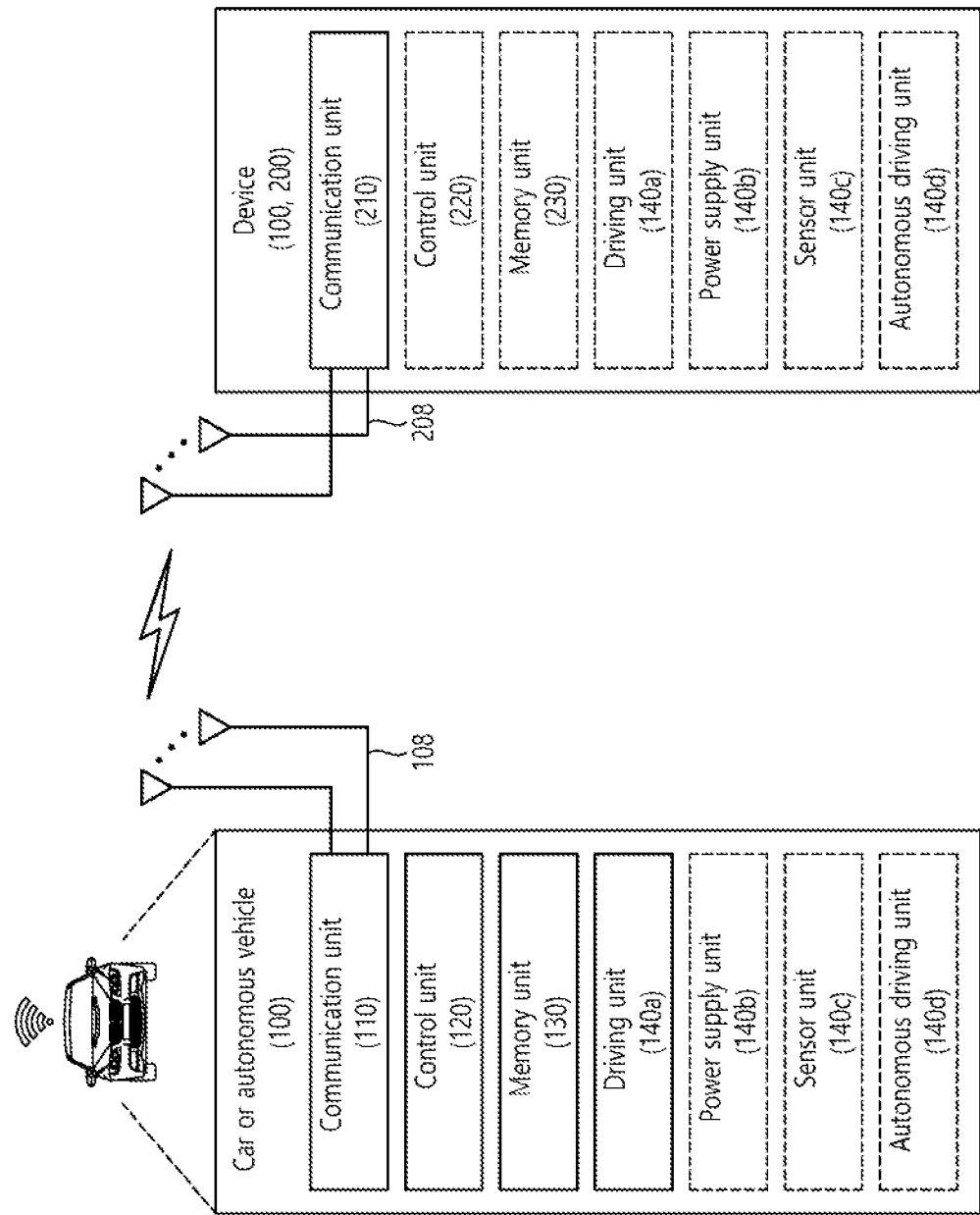
FIG. 26 shows a vehicle or an autonomous vehicle, based on an embodiment of the present disclosure.

FIG. 26 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   transmitting, to a second device, sidelink control information (SCI) for scheduling a physical sidelink shared channel (PSSCH) through a physical sidelink control channel (PSCCH); and
   transmitting, to the second device, data through the PSSCH,
   wherein the SCI includes a field related to a first resource reservation period,
   wherein the first resource reservation period is time period,
   wherein the first resource reservation period is one of a plurality of candidate resource reservation periods related to a resource pool configured to the first device,
   wherein a bit size of the field corresponds to a number of the candidate resource reservation periods related to the resource pool configured to the first device according to a $\log_2$ relationship, and
   wherein the $\log_2$ relationship is $X=\log_2 N$, wherein X is the bit size of the field and N is the number of the candidate resource reservation periods related to the resource pool configured to the first device.

2. The method of claim 1,
   wherein a number of the plurality of candidate resource reservation periods is less than or equal to a maximum number of candidate resource reservation periods.

3. The method of claim 1,
   wherein the first resource reservation period is one of a plurality of the candidate resource reservation periods related to the pool in a predetermined order, and
   wherein the predetermined order is an ascending order from a smallest candidate resource reservation period related to the resource pool to a largest candidate resource reservation period related to the resource pool.

4. The method of claim 1, further comprising:
   sensing transmission resources based on a first priority;
   selecting a first transmission resource to a second transmission resource based on the sensing; and
   reselecting the first transmission resource based on the first transmission resource being overlapped with a third transmission resource to be used by the second device,
   wherein the SCI includes information for sharing the first transmission resource with other devices.

5. The method of claim 4, wherein a second priority of a first packet to be transmitted in the third transmission resource is higher than a pre-configured priority.

6. The method of claim 5, further comprising:
   comparing the second priority of the first packet to be transmitted in the third transmission resource with the first priority when a second packet to be transmitted in the first transmission resource is not transmitted,
   wherein the second priority of the first packet to be transmitted in the third transmission resource is higher than the first priority.

7. A first device configured to perform wireless communication by a first device and comprising:
   a transceiver; and
   control circuitry configured to:
   control the transceiver to transmit, to a second device, sidelink control information (SCI) for scheduling a physical sidelink shared channel (PSSCH) through a physical sidelink control channel (PSCCH); and
   control the transceiver to transmit, to the second device, data through the PSSCH,
   wherein the SCI includes a field related to a first resource reservation period,
   wherein the first resource reservation period is time period,
   wherein the first resource reservation period is one of a plurality of candidate resource reservation periods related to a resource pool configured to the first device,
   wherein a bit size of the field corresponds to a number of the candidate resource reservation periods related to the resource pool configured to the first device according to a $\log_2$ relationship, and
   wherein the $\log_2$ relationship is $X=\log_2 N$, wherein X is the bit size of the field and N is the number of the candidate resource reservation periods related to the resource pool configured to the first device.

8. The first device of claim 7,
   wherein the first resource reservation period is one of a plurality of the candidate resource reservation periods related to the pool in a predetermined order, and
   wherein the predetermined order is an ascending order from a smallest candidate resource reservation period related to the resource pool to a largest candidate resource reservation period related to the resource pool.

* * * * *